(12) United States Patent
Au Yeung et al.

(10) Patent No.: US 8,774,326 B2
(45) Date of Patent: Jul. 8, 2014

(54) RECEIVER SYSTEM AND METHOD OF OPERATION THEREOF

(75) Inventors: Chun Kin Au Yeung, San Diego, CA (US); Sungsoo Kim, San Diego, CA (US); Jungwon Lee, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 136 days.

(21) Appl. No.: 13/441,896

(22) Filed: Apr. 8, 2012

(65) Prior Publication Data

US 2012/0257692 A1   Oct. 11, 2012

Related U.S. Application Data

(60) Provisional application No. 61/473,703, filed on Apr. 8, 2011, provisional application No. 61/542,249, filed on Oct. 2, 2011.

(51) Int. Cl.
*H04L 27/06* (2006.01)

(52) U.S. Cl.
USPC ........... 375/341; 375/220; 375/262; 375/267; 375/316; 375/320; 375/340; 375/347; 455/101; 455/132; 455/500; 455/562.1; 370/344; 370/464; 370/480; 714/794; 714/795; 714/796; 341/173

(58) Field of Classification Search
USPC ......... 375/220, 262, 267, 316, 320, 340, 341, 375/347; 455/101, 132, 500, 562.1; 370/344, 464, 480; 714/794, 795, 796; 341/173
See application file for complete search history.

(56) References Cited

U.S. PATENT DOCUMENTS

| | | | |
|---|---|---|---|
| 7,398,453 B2 * | 7/2008 | Yu | .................................. 714/778 |
| 8,027,401 B2 | 9/2011 | Hwang et al. | |
| 8,054,904 B2 | 11/2011 | Hwang et al. | |
| 2007/0260959 A1 * | 11/2007 | Sidi et al. | ........................ 714/755 |
| 2008/0109701 A1 * | 5/2008 | Yu et al. | ......................... 714/760 |
| 2010/0183065 A1 | 7/2010 | Siti et al. | |

OTHER PUBLICATIONS

Brink et al, "Iterative demapping for QPSK modulation", "Electronics Letters", Jul. 23, 1998, pp. 1459-1460, vol. 34, No. 15.

* cited by examiner

*Primary Examiner* — Leon Flores
(74) *Attorney, Agent, or Firm* — IP Investment Law Group

(57) ABSTRACT

A method of operation of a communication system includes: utilizing an estimation module estimating a log-likelihood ratio for a transmission; and utilizing a slicing module, coupled to the estimation module, slicing a constellation by: reading the log-likelihood ratio from the estimation module, defining a threshold within the constellation, and adjusting the threshold based on the log-likelihood ratio for determining a symbol.

20 Claims, 23 Drawing Sheets

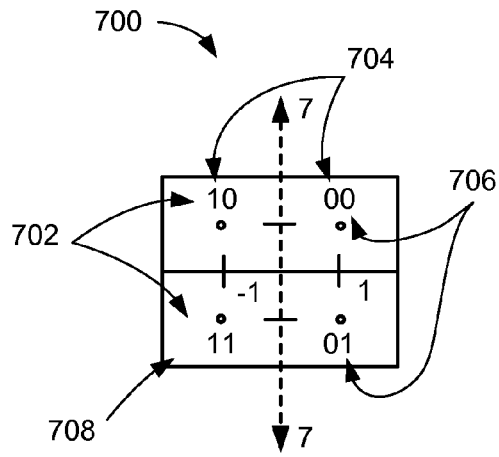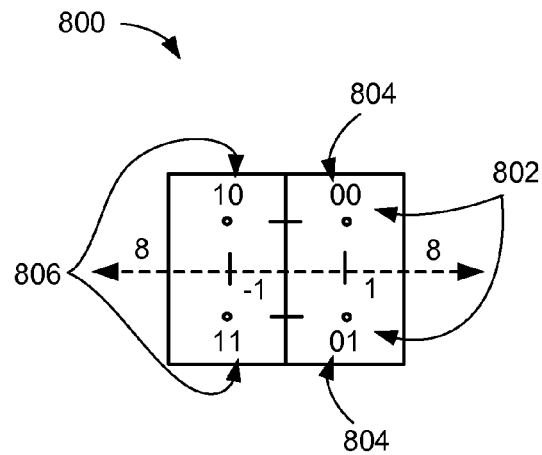
FIG. 7    FIG. 8
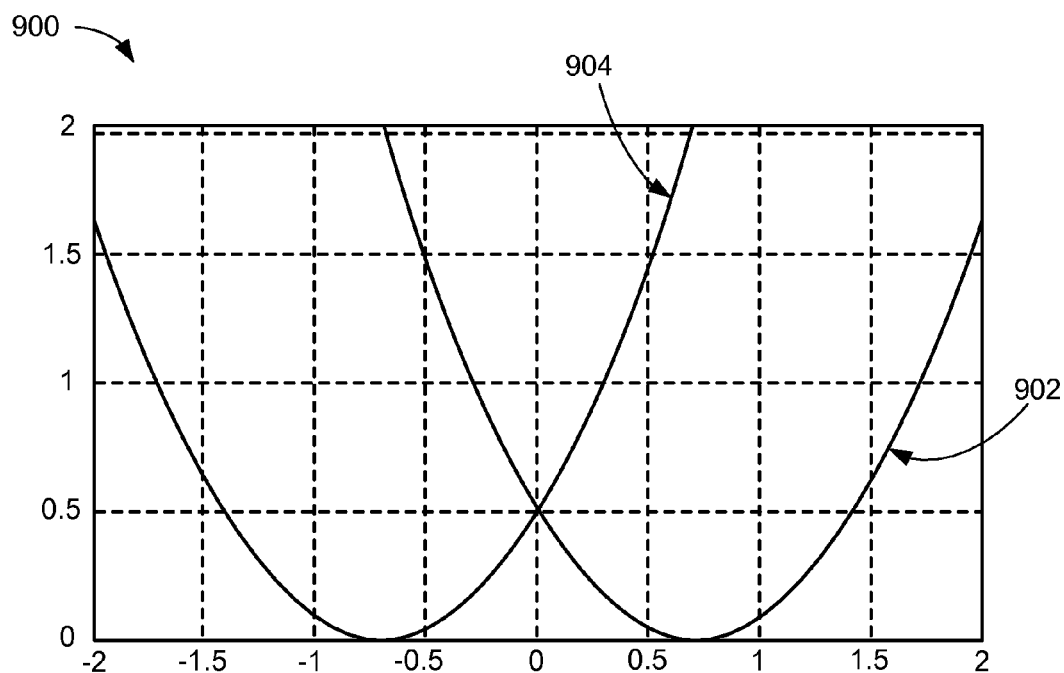
FIG. 9

RECEIVER SYSTEM AND METHOD OF OPERATION THEREOF

CROSS-REFERENCE TO RELATED APPLICATION(S)

This application claims the benefit of U.S. Provisional Patent Application Ser. No. 61/473,703 filed Apr. 8, 2011 and 61/542,249 filed Oct. 2, 2011, and the subject matter thereof is incorporated herein by reference thereto.

TECHNICAL FIELD

The present invention relates generally to a signal processing system and more particularly to a system for detection and decoding a received signal.

BACKGROUND

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

Wireless signal communications currently used in wireless devices such as digital TV, cellular phones, laptops, and satellite communications systems and are integral to the modern telecommunication infrastructure. Multiple-input multiple-output (MIMO) technology is a key enabling technology for next generation wireless communication systems and is widely adopted in many standards, including third generation partnership project (3GPP) Long Term Evolution (LTE), Institute of Electrical and Electronics Engineers (IEEE) 802.11n, and IEEE 802.16e. A wireless device can become impractically complex when decoding denser data transmissions.

Thus, a need still remains for detection and decoding mechanisms to effectively incorporate known information of the data transmissions. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a communication system including: utilizing an estimation module estimating a log-likelihood ratio for a transmission; and utilizing a slicing module, coupled to the estimation module, slicing a constellation by: reading the log-likelihood ratio from the estimation module, defining a threshold within the constellation, and adjusting the threshold based on the log-likelihood ratio for determining a symbol.

The present invention provides a communication system including: an estimation module for estimating a log-likelihood ratio for bits of a transmission; and a slicing module, coupled to the estimation module, and the slicing module for slicing a constellation by reading the log-likelihood ratio from the estimation module, defining a threshold within the constellation, and adjusting the threshold based on the log-likelihood ratio for determining a symbol.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 7 is a plot of a first quadrature phase-shift keying (QPSK) constellation for use in an embodiment of the present invention.

FIG. 8 is a plot of a second QPSK constellation for use in an embodiment of the present invention.

FIG. 9 is a plot for a binary phase-shift keying (BPSK) cost function without a priori information.

FIG. 27 is a plot of a third 64QAM constellation for use in an embodiment of the present invention.

FIG. 28 is a plot of a fourth 64QAM constellation for use in an embodiment of the present invention.

BEST MODE FOR CARRYING OUT THE INVENTION

Figure 1:
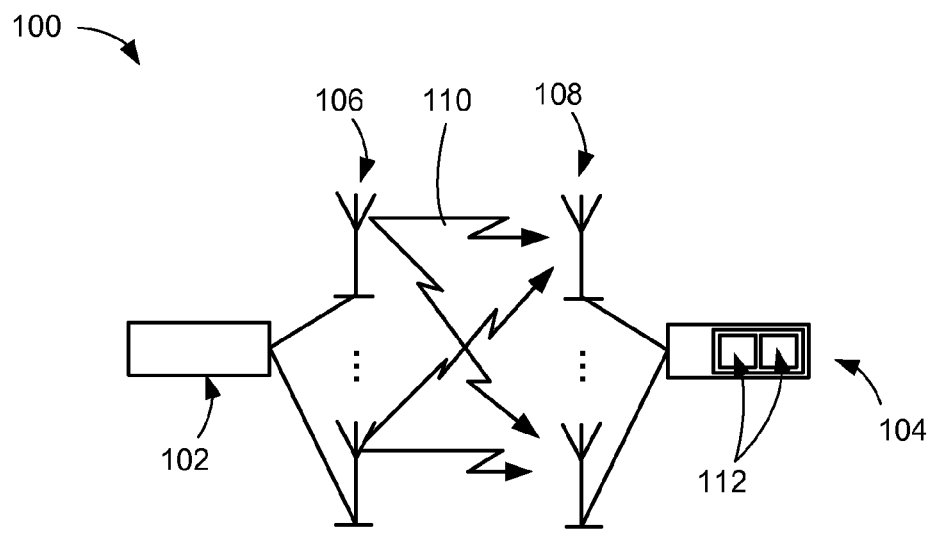
FIG. 1 is a block diagram of a communication system in an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it will be apparent that the invention can be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

In addition, where multiple embodiments are disclosed and described having some features in common, for clarity and ease of illustration, description, and comprehension thereof, similar and like features from one to another will ordinarily be described with like reference numerals. The embodiments have been numbered first embodiment, second embodiment, etc. as a matter of descriptive convenience and are not intended to have any other significance or provide limitations for the present invention.

Referring now to FIG. 1, therein is shown a block diagram of a communication system 100 in an embodiment of the present invention. The communication system 100 can have a transmitter block 102 and a receiver block 104.

The transmitter block 102 can have multiple transmit antennae 106 coupled to the transmitter block 102. The multiple transmit antennae 106 can include two or more antennae. The receiver block 104 can also have multiple receive antennae 108 coupled to the receiver block 104. The multiple receive antennae 108 can include two or more antennae, and can include a fewer number of antennae than the multiple transmit antennae 106. The multiple receive antennae 108 can also have only a single antenna. The number of the multiple receive antennae 108 and the multiple transmit antennae 106 can be the same but are not limited to the same number.

The transmitter block 102 can take a high data rate signal and process it using bit-interleaved coded modulation (BICM). The transmitter block 102 can then spatially multiplex the BICM signal to form multiple transmissions 110 broadcast from the multiple transmit antennae 106. The multiple transmissions 110 can consist of multiple spatially multiplexed coded data streams with each codeword spanning multiple subcarriers. At the receiver block 104, iteratively performing MIMO detection and decoding (IDD) provides significant performance boost.

The multiple transmissions 110 can be pre-coded by multi-stream beam forming to distinguish the multiple transmissions 110 at the receiver block 104. The receiver block 104 can include physical hardware 112 such as a detector, decoder, a processor, or a combination thereof.

The communication system 100 can be a BICM system with 2×2 MIMO indicating two of the multiple transmit antennae 106 and two of the multiple receive antennae 108. This yields two of the multiple transmissions 110 in two spatial data streams that are multiplexed together. A code word is transmitted along multiple subcarriers.

The communication system 100 can be a point-to-point orthogonal frequency-division multiplexing (OFDM) system with a $M_T$ number of the multiple transmit antennae 106 and a $M_R$ number of the multiple receive antennae 108. It can be assumed fading is frequency flat over each subcarrier and the input-output system for subcarrier k can be represented by Equation 1:

$$y_k = \sum_{t=1}^{M_T} h_{k,t} X_{k,t} + n_k, \qquad \text{(Equation-1)}$$

where $y_k \in C^{M_T}$ is the receive vector, $h_{k,i} \in C^{M_R}$, $i=1, \ldots, M_T$ are the complex channel vectors, $x_{k,i} \in C$, $i=1, \ldots, M_T$ are the transmit symbols, and $n_k \in C^{M_R}$ is the additive white Gaussian noise vector with covariance $E(n_k n_k^H) = \sigma^2 I$. For clarity of describing the receiver block 104 the subcarrier index k can be dropped from (Equation-1). Also, the effects of precoding can be reflected in channel vectors $h_i$, which the receiver can be assumed to estimate perfectly. Transmit symbols $x_i$, $i=1, \ldots, M_T$, can belong to one of the QAM constellations, including QPSK, 16QAM, or 64QAM of FIG. 7, 8, 14-17, or 25-30. The receiver block 104 can be used for transformation of the multiple transmissions 110 of real world physicals objects for display.

Figure 2:
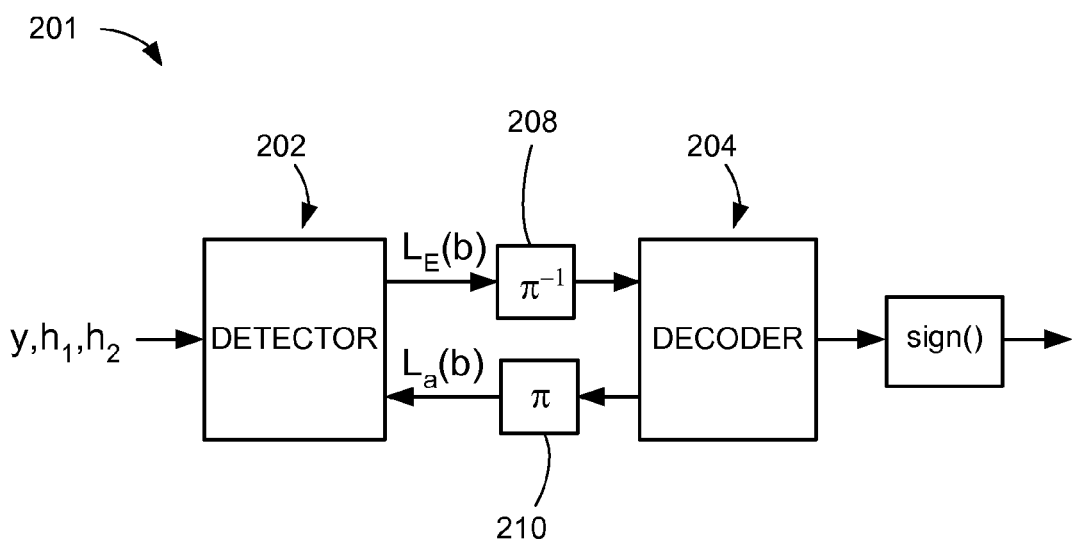
FIG. 2 is a block diagram of a receiver system in a first embodiment of the present invention.

Referring now to FIG. 2, therein is shown a block diagram of a receiver system 201 in a first embodiment of the present invention. The receiver system 201 can be coupled to or operate within the receiver block 104 of FIG. 1. The receiver system 201 can operate on, include, or be implemented as a physical hardware device. The receiver system 201 can have a detector block 202 and a decoder block 204. The detector block 202 reads the received symbol y and the channel estimates $h_1$ and $h_2$ when there are two antennas, or $h_1, \ldots, h_{M_T}$ when there are $M_T$ antennas.

A QAM constellation can be viewed as two dimensional pulse amplitude modulation (PAM) symbol set represented as Equation 2:

$$P(a,m) = \{\pm a, \pm 3a, \ldots, \pm 2^{m-1}a\}, \quad \text{(Equation-2)}$$

a can denote half of the inter-modulation distance and m can denote the number of bits needed to represent the PAM constellation of $2^m = |P(a,m)|$. The constellations can be mathematically represented by Equations 3, 4, and 5:

$$X_{QPSK} = \{x_r + jx_i \mid x_r, x_i \in P(a,1)\}, a = \frac{1}{\sqrt{2}} \quad \text{(Equation-3)}$$

$$X_{16QAM} = \{x_r + jx_i \mid x_r, x_i \in P(a,2)\}, a = \frac{1}{\sqrt{10}} \quad \text{(Equation-4)}$$

$$X_{64QAM} = \{x_r + jx_i \mid x_r, x_i \in P(a,3)\}, a = \frac{1}{\sqrt{42'}} \quad \text{(Equation-5)}$$

where $j = \sqrt{-1}$. A bit vector can be specified as $b \in \{0,1\}^m$ and the modulated symbol x from constellation X will have a size of $|X| = 2^m$. The bits-to-modulation mapping function can be represented as Equation 6:

$$X(b) = x. \quad \text{(Equation-6)}$$

The constellation sets for $x_i, i = 1, \ldots, M_T$ are represented by Equation 7:

$$x_i \in X_i \in \{X_{QPSK}, X_{16QAM}, X_{64QAM}\}. \quad \text{(Equation-7)}$$

$m_i$ is further represented as $m_i \triangleq \log_2 |X_i|$ or the number of bits for the modulation symbols in $X_i$.

The detector block 202 computes the extrinsic log-likelihood ratio (LLR) for each coded bit and passes them to a deinterleiver block 208 and from the deinterleiver block 208 to the decoder block 204. The symbols $x_2, \ldots, x_{M_T}$ can be detected "soft" and $x_1$ can be detected "hard", in other words, one hard detections and multiple soft detections. A "soft" detection of a spatial dimension is defined as outputting LLRs for each coded bit in these dimensions. A "hard" detection of a spatial dimension is defined as outputting a symbol from a constellation.

Detecting some dimensions hard and some soft is considered "dimensional reduction" and is especially useful when the information bits are encoded into multiple codewords and only a subset of spatial dimensions need to be detected soft at a given time. Dimensional reduction can be extended to include detections when a priori data is available. Also, all symbols can be detected "soft" or "hard" depending on the design parameters of the receiver system 201. Two sets of systems are described below where the first system has $M_T$ transmit antennas and the second system has two transmit antennas. Those of ordinary skill in the art are capable of discerning when hard and soft detection are being described by the equations.

Detection functions that demap modulation symbol x to bit vector b and to the l-th bit can be represented by Equation 8:

$$X^{-1}(x) = b, \quad \text{(Equation-8)}$$

and Equation 9:

$$X_l^{-1}(x) = b_l. \quad \text{(Equation-9)}$$

The bit value of 0 can be labled as "positive" and the bit value of 1 can be labled as "negative". This is represented by Equation 10:

$$b(b_\ell) = \begin{cases} +1 & \text{if } b_\ell = 0 \\ -1 & \text{if } b_\ell = 1. \end{cases} \quad \text{(Equation-10)}$$

A positive constellation and a negative constellation for the l-th bit can be represented by Equation 11:

$$X_l^{(+)} = \{x \in X_l \mid X_l^{-1}(x) = 0\}, \quad \text{(Equation-11)}$$

and Equation 12:

$$X_l^{(-)} = \{x \in X_l \mid X_l^{-1}(x) = 1\}. \quad \text{(Equation-12)}$$

The a priori LLR of the l-th bit of $x_i$ can be represented by Equation 13:

$$L_a(i,\ell) = \log \frac{p(b(b_{i\ell}) = +1)}{p(b(b_{i\ell}) = -1)}, \quad \text{(Equation-13)}$$

A maximum logrithmic maximum a posteriori (max-log-MAP) detector can be used to reduce complexity for computing the a posteriori LLR for $b_{il}$, $i > 1$. Using max-log-MAP criterion, the a posteriori LLR for $b_{il}$ is represented by Equation 14:

$$L_A(i,\ell) = \max_{\substack{x_t \in X_t, t \neq i \\ x_i \in x_i^{(+)}}} \left\{ -\frac{1}{\sigma^2} \left\| y - \sum_{s=1}^{M_T} h_s \bar{x}_s \right\|^2 + \sum_{s=1}^{M_T} \sum_{s_\ell=1}^{m_t} \frac{1}{2} b(X_{s,i}^{-1}(\bar{x}_s)) L_a(s,s_\ell) \right\} - \max_{\substack{x_t \in X_t, t \neq i \\ x_i \in x_i^{(-)}}} \{\cdots\}, \quad \text{(Equation-14)}$$

where the content in the second brace can be identical to the content in the first brace.

The extrinsic LLR ($L_e$) is calculated within the detector block 202 by subtracting a priori LLR from a posteriori LLR and represented as Equation 15:

$$L_e(i,l) = L_A(i,l) - L_a(i,l), \quad \text{(Equation-15)}$$

and is passed on to the decoder block 204 from the deinterleiver block 208. By treating the extrinsic LLR from the detector block 202 as prior information, the decoder block 204 tries to improve the quality of the LLR. The decoder block 204 then internally calculates an extrinsic LLR and passes the extrinsic LLR through an interleiver block 210 and from the interleiver block 210 to the detector block 202. The detector block 202 can treat the extrinsic LLR as prior information for the next iteration to output a more accurate LLR. The IDD can terminate if there is a mechanism to check for codeword correctness such as a cyclic redundancy check (CRC), or if a preset number of global iterations is reached.

The receiver system 201 can be used for transformation of the multiple transmissions 110 of FIG. 1 conveying real world physicals objects for display. The multiple transmissions 110 of FIG. 1 can convey images, schematics, maps, sounds and other information of real world physical objects for display.

Figure 3:
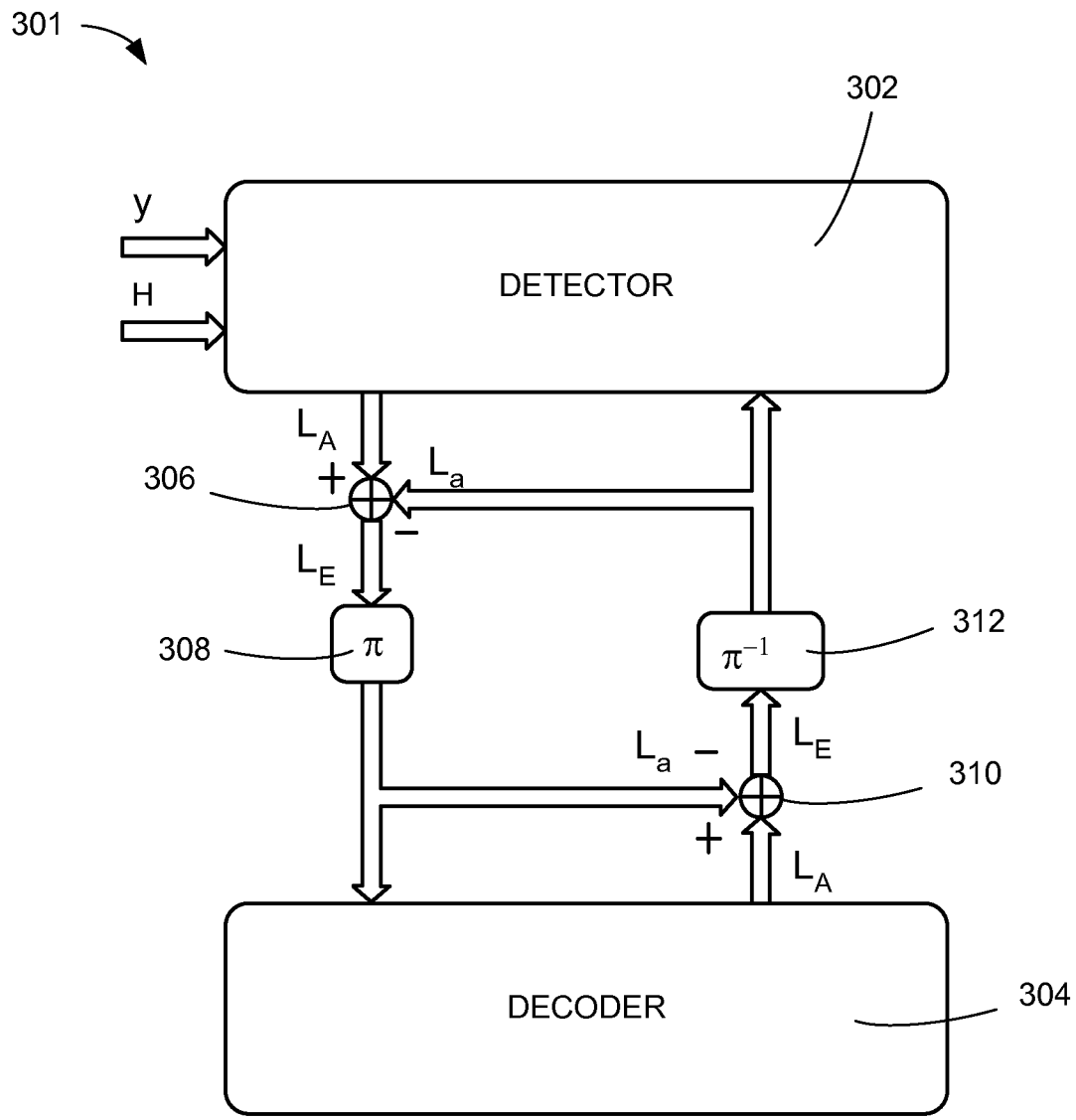
FIG. 3 is a block diagram of a receiver system in a second embodiment of the present invention.

Referring now to FIG. 3, therein is shown a block diagram of a receiver system 301 in a second embodiment of the present invention. The receiver system 301 can be coupled to or operate within the receiver block 104 of FIG. 1. The receiver system 301 can operate on, include, or be implemented as a physical hardware device. The receiver system 301 is shown having a detector block 302 and a decoder block 304 and can be based on the turbo principle.

The detector block 302 for example, can compute the a posteriori LLR ($L_A$) of $b_k$ of a two transmit system, $b_{l(x)}$ means the bit value of the $l^{th}$ bit of x, and $L_a(b_l)$ is the prior information for the same bit. The a posteriori LLR of the two transmit system can be represented by Equation 16:

$$L_A(b_k) = \log \frac{P(b_k = +1 \mid y)}{P(b_k = -1 \mid y)} = \qquad \text{(Equation-16)}$$

$$\log \frac{\sum_{x:b_k=+1} \exp\left(-\frac{1}{\sigma^2}\|y - h_1 x_1 - h_2 x_2\|^2 + \frac{1}{2}\sum_\ell b_\ell(x) L_a(b_\ell)\right)}{\sum_{x:b_k=-1} \exp\left(-\frac{1}{\sigma^2}\|y - h_1 x_1 - h_2 x_2\|^2 + \frac{1}{2}\sum_\ell b_\ell(x) L_a(b_\ell)\right)}.$$

Computing the a posteriori LLR approximation of $b_k$ involves solving two optimization problems represented by Equation 17:

$$L_A(i, l) = \qquad \text{(Equation-17)}$$

$$\max_{x_t \in X_t, t \neq i, x_i \in X_i^{(+)}} \left\{ -\frac{1}{\sigma^2} \left\| y - \sum_{s=1}^{M_T} h_s \bar{x}_s \right\|^2 + \sum_{s=1}^{M_T} \sum_{s_f=1}^{M_T} \frac{1}{2} b(X_{s,i}^{-1}(\bar{x}_s)) L_a(s, s_l) \right\}$$

and $$L_A(i, l) =$$

$$\max_{x_t \in X_t, t \neq i, x_i \in X_i^{(-)}} \left\{ -\frac{1}{\sigma^2} \left\| y - \sum_{s=1}^{M_T} h_s \bar{x}_s \right\|^2 + \sum_{s=1}^{M_T} \sum_{s_f=1}^{M_T} \frac{1}{2} b(X_{s,i}^{-1}(\bar{x}_s)) L_a(s, s_l) \right\}.$$

The receiver system 301 can be depicted as a 2×2 spatially multiplexed system employing multi-QAM (M-QAM) in each stream, there are $M^2$ solution candidates. In a Gray-coded symbol-to-bit mapping, the detector block 302 can isolate one stream at a time by computing an imaginary or a real dimension separately.

An a priori LLR ($L_a$) from the decoder block 304 can be subtracted from the $L_A$ in a first detector adder 306 to produce an extrinsic LLR ($L_e$). The extrinsic LLR is then passed through an interleaver block 308 as an input to the decoder block 304.

An a priori LLR ($L_a$) from the detector block 302 can be subtracted from an $L_A$ provided by the decoder block 304 in a second decoder adder 310, external to the decoder block 304, to produce an extrinsic LLR. The extrinsic LLR is then passed through a deinterleaver block 312 as an input to the detector block 302.

Figure 4:
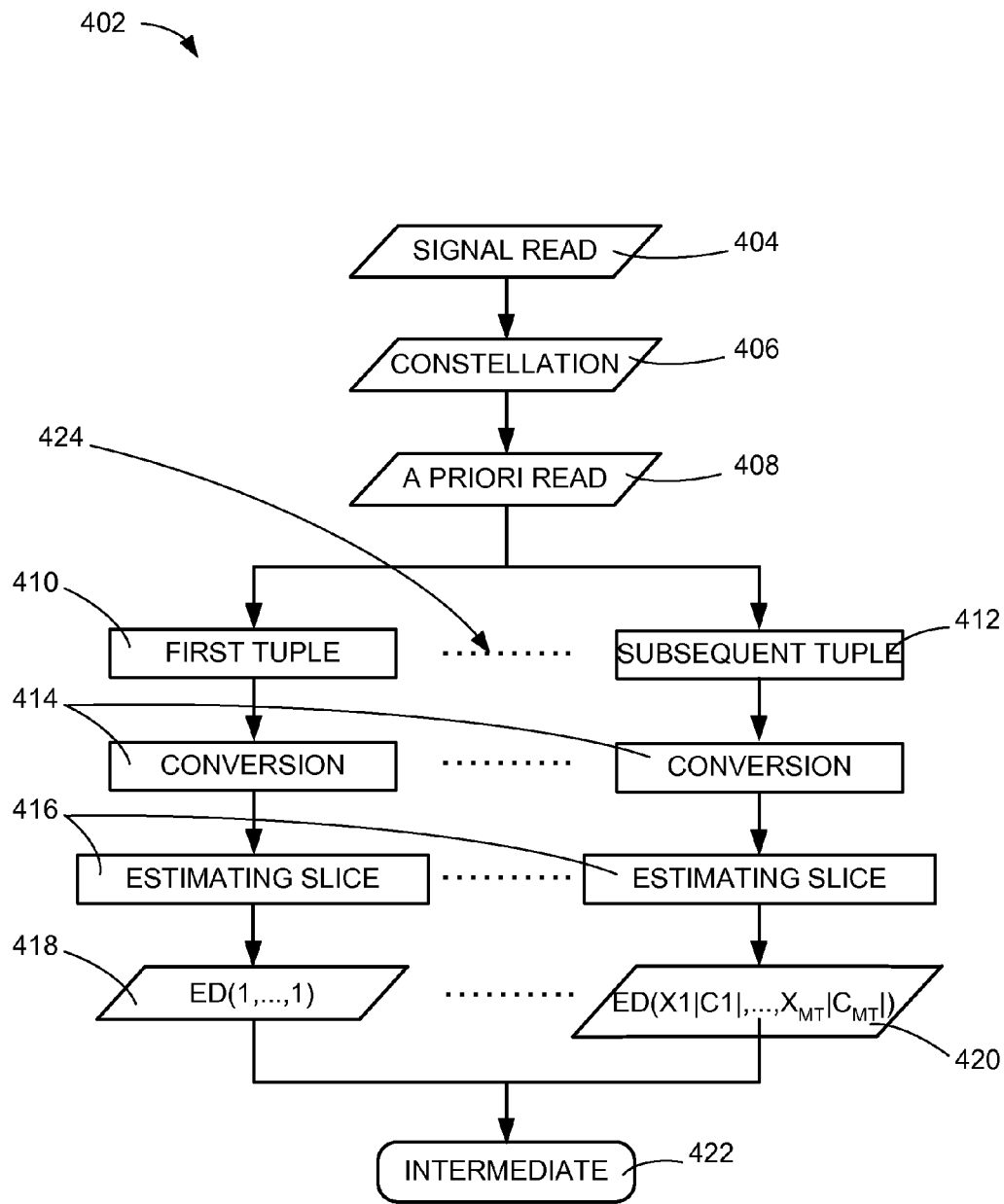
FIG. 4 is a flow chart of an estimation module for use in an embodiment of the present invention.

Referring now to FIG. 4, therein is shown a flow chart of an estimation module 402 for use in an embodiment of the present invention. The estimation module 402 can be implemented by the receiver system 201 of FIG. 2. More specifically, the estimation module 402 can be implemented by the detector block 202 of FIG. 2, or the detector block 302 of FIG. 3. The estimation module 402 can operate on, include, or be implemented as a physical hardware device.

The estimation module 402 can include a priori information. The estimation module 402 can also include a signal read block 404 that reads received signals y, and channel estimates $h_1, \ldots, h_{MT}$.

The signal read block 404 can be coupled to a constellation block 406. The constellation block 406 can associate transmit symbols $x_i$, i=1, ..., $M_T$, to one of the QPSK, 16QAM, or 64QAM constellations. Gray coding is used for each dimension of the constellation and the corresponding PAM signal along the real axis or imaginary axis. The constellation symbols are normalized, each constellation has unit average energy represented by Equation 18:

$$E(|x|^2)=1 \qquad \text{(Equation-18)}$$

The transmit symbol $x_i$, i=1, ..., $M_T$ can include a PAM symbol set represented as Equation 19:

$$P(a,m)=\{\pm a, \pm 3a, \ldots, \pm 2^{m-1} a\}, \qquad \text{(Equation-19)}$$

a can denote half of the inter-modulation distance and m can denote the number of bits needed to represent the PAM constellation of $2^m = |P(a,m)|$. The constellations can be mathematically represented by Equation 20:

$$X_{QPSK} = \{x_r + jx_i \mid x_r, x_i \in P(a, 1)\}, a = \frac{1}{\sqrt{2}}, \qquad \text{(Equation-20)}$$

and Equation 21:

$$X_{16QAM} = \{x_r + jx_i \mid x_r, x_i \in P(a, 2)\}, a = \frac{1}{\sqrt{10}}, \qquad \text{(Equation-21)}$$

and Equation 22:

$$X_{64QAM} = \{x_r + jx_i \mid x_r, x_i \in P(a, 3)\}, a = \frac{1}{\sqrt{42}}, \qquad \text{(Equation-22)}$$

where $j=\sqrt{-1}$. A bit vector can be specified as $b \in \{0,1\}^m$ and the modulated symbol x from constellation X of size $|X|=2^m$. The bits-to-modulation mapping function can be represented as Equation 23:

$$X(b)=x. \qquad \text{(Equation-23)}$$

The constellation sets for $x_i$, i=1, ..., $M_T$ are represented by Equation 24:

$$x_i \in X_i \in \{X_{QPSK}, X_{16QAM}, X_{64QAM}\}. \qquad \text{(Equation-24)}$$

$m_i$ is further represented as $m_i \triangleq \log_2 |X_i|$ or the number of bits for the modulation symbols in $X_i$. Constellation $C_i$, i=1, ..., $M_T$, can also be represented as Equation 25:

$$C_i = \text{constellation of } x_i = \{x_{i1}, \ldots, x_{i|Ci|}\}. \qquad \text{(Equation-25)}$$

An a priori read block 408 can be coupled to the constellation block 406. The a priori read block 408 reads prior information and includes this information into calculations made by the estimation module 402. Bit LLRs $L_{a1}(1)$ to $L_{a1}(\log_2(|C_1|))$ for $x_1$ to $L_{aMT}(1)$ to $L_{aMT}(\log_2(|C_{MT}|))$ for $x_{MT}$ can be included for further determining the output of the estimation module 402.

Parallel processing of every feasible candidate vector are evaluated in a first tuple block 410 and a subsequent tuple block 412. The first tuple block 410 and the subsequent tuple block 412 can be coupled to each other and to the a priori read block 408. When detecting $x_1$ "hard" and all other symbols soft, every feasible candidate vector $(\bar{x}_2, \ldots, \bar{x}_{M_T})$ are evaluated. The parallel processing does not need to be clock synchronized.

Conversion blocks 414 can be coupled to the first tuple block 410 and the subsequent tuple block 412. The conversion block 414 can cancel the interference caused by symbols $x_2, \ldots x_{M_T}$ and convert the system to an additive white Gaussian noise (AWGN) system by maximal ratio combining (MRC). The output of conversion block 414 can be represented by Equation 26:

$$\tilde{x}_1 = \frac{h_1^H}{\|h_1\|^2}\left(y - \sum_{s=2}^{M_T} h_s \bar{x}_s\right). \quad \text{(Equation-26)}$$

The output of the conversion blocks 414 can be viewed as an AWGN system y=Ax+n where x belongs to a QAM constellation, A is a real channel coefficient, and n is white Gaussian. Estimating slice blocks 416 can be coupled to the conversion blocks 414 and can detect a single constellation represented by Equation 27:

$$\hat{x}_1(\bar{x}_2, \ldots, \bar{x}_{M_T}) = Q(\tilde{x}_1). \quad \text{(Equation-27)}$$

A first tuple distance block 418 can be coupled to one of the estimating slice blocks 416 and a subsequent tuple distance block 420 can be coupled to another of the estimating slice blocks 416. The Euclidian distance (ED) of the first tuple from the first tuple distance block 418 can be represented by Equation 28:

$$ED(1, \ldots, 1) = \frac{1}{\sigma^2}\left\|y - h_1 Q(\tilde{x})_1 - \sum_{s=2}^{M_T} h_s x_{s1}\right\|^2 - \sum_{s_l=1}^{m_1} \frac{1}{2} b(X_{s,i}^{-1}(Q(\tilde{x}_1))) L_a(1, s_l) - \sum_{s=2}^{M_T} \sum_{s_l=1}^{m_s} \frac{1}{2} b(X_{s,i}^{-1}(x_{s1})) L_a(s, s_l) \quad \text{(Equation-28)}$$

An ED for the subsequent tuple of the symbol x from the subsequent tuple distance block 420 can be represented by Equation 29:

$$ED(|C2|, \ldots, |C_{M_T}|) = \frac{1}{\sigma^2}\left\|y - h_1 Q(\tilde{x}_1) - \sum_{s=2}^{M_T} h_s x_{s|Cs|}\right\|^2 - \sum_{s_l=1}^{m_1} \frac{1}{2} b(X_{s,i}^{-1}(Q(\tilde{x}_1))) L_a(1, s_l) - \sum_{s=2}^{M_T} \sum_{s_l=1}^{m_s} \frac{1}{2} b(X_{s,i}^{-1}(x_{s|Cs|})) L_a(s, s_l) \quad \text{(Equation-29)}$$

An intermediate block 422 can be coupled to the subsequent tuple distance block 420 and the first tuple distance block 418. By storing the Euclidean distances from the first tuple distance block 418 and the subsequent tuple distance block 420 for each $(\bar{x}_2, \ldots, \bar{x}_{M_T})$ tuple, calculating an a posteriori LLR is equivalent to selecting the proper tuples, or ordered list of elements, and calculating the difference. A tuple is defined as the grouping of bits associated with a symbol. Multiple parallel tracks 424 for evaluating distance from the first to last tuple in a symbol can also be coupled to the intermediate block 422.

Figure 5:
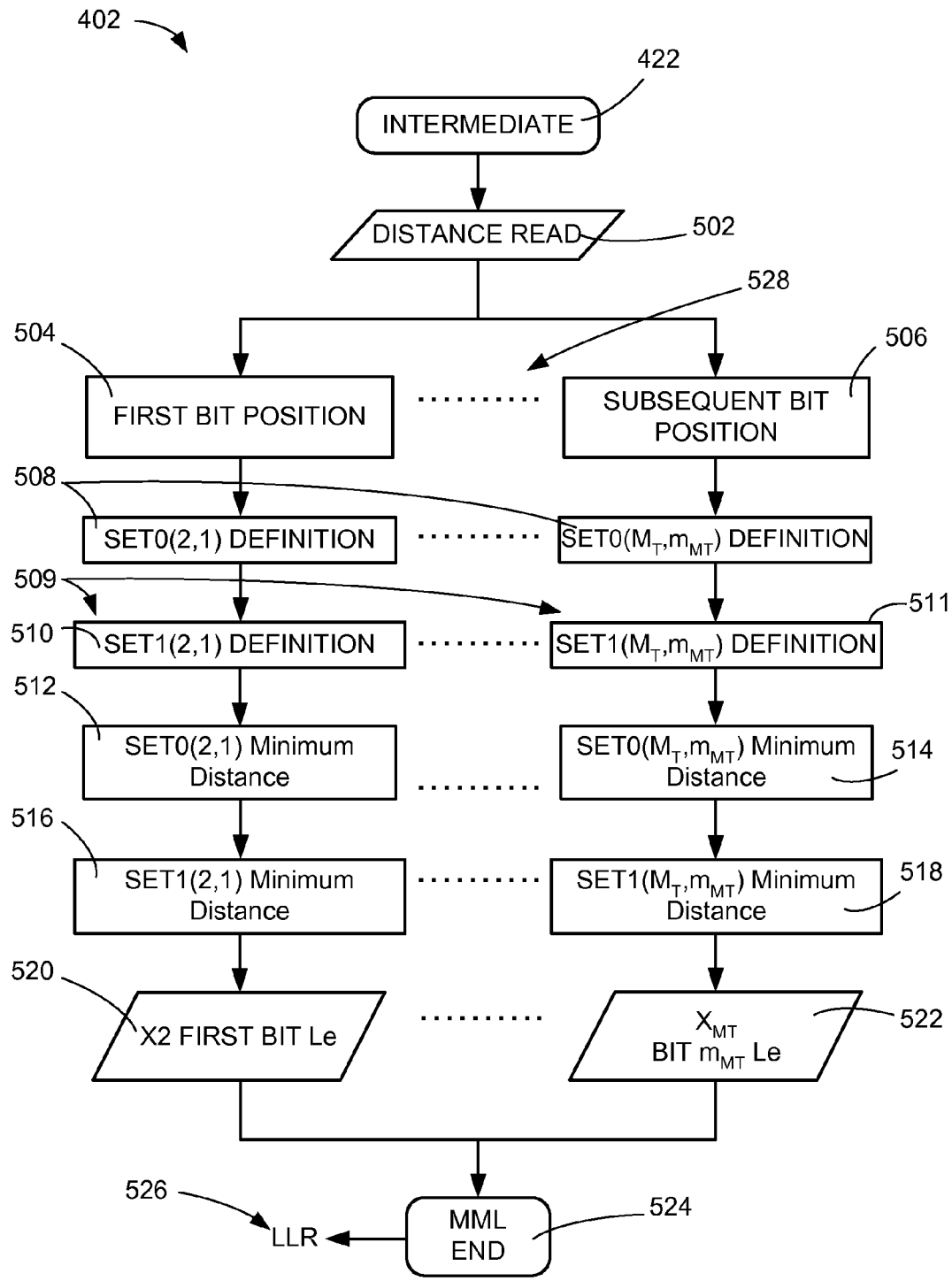
FIG. 5 is a continuation of the flow chart for the estimation module of FIG. 4.

Referring now to FIG. 5, therein is shown a continuation of the flow chart for the estimation module 402 of FIG. 4. The estimation module 402 can include the intermediate block 422 coupled to a distance read block 502 that can read the $ED(1, \ldots, 1)$ to $ED(|C2|, \ldots, |C_{M_T}|)$ and can also read a priori information.

Parallel processing of symbols $x_2, \ldots, x_{M_T}$ in a first bit position block 504 and in a subsequent bit position block 506 can be coupled to each other and to the distance read block 502. The first bit position block and the subsequent bit position block 506 can consider a first to $m_2$-th bit of x2, ..., first bit to $m_{M_T}$-th bit of $x_{M_T}$. The position of the first bit and the subsequent bit can be calculated simultaneously.

Set0(s,k) definition blocks 508, or the bit k of layer s, can be coupled to both the first bit position block 504 and the subsequent bit position block 506. The set0(s,k) definition blocks 508 define set0(s,k) to be the set of the k-th bit of symbol xs being 0 such that the value of bit k equals zero. Set1(s,k) definition blocks 509 can be coupled to the set0(s,k) definition blocks 508. The set1(s,k) definition blocks 509 define set1(s,k) to be the set of the k-th bit of symbol xs being 1 such that the value of bit k equals one. The set1(s,k) definition blocks 509 can include a set1(2,1) definition block 510 and a set1($M_T$,$m_{M_T}$) definition block 511.

A set0(2,1) minimum distance block 512 can be coupled to the set1(2,1) definition block 510 and a set0($M_T$,$m_{M_T}$) minimum distance block 514 can be coupled to the set1($M_T$,$m_{M_T}$) definition block 511. The set0(2,1) minimum distance block 512 and the set0($M_T$,$m_{M_T}$) minimum distance block 514 can compute the minimum ED*(s,k,0) for set0(s,k) represented by Equation 30:

$$ED^*(s, k, 0) = \min_{x \in Set0(s,k)} ED(x). \quad \text{(Equation-30)}$$

A set1(2,1) minimum distance block 516 can be coupled to the set0(2,1) minimum distance block 512 and a set1($M_T$, $m_{M_T}$) minimum distance block 518 can be coupled to the set0($M_T$,$m_{M_T}$) minimum distance block 514. The set1(2,1) minimum distance block 516 and the set0($M_T$,$m_{M_T}$) minimum distance block 514 can compute the minimum ED*(s, k,1) for set1(s,k) represented by Equation 31:

$$ED^*(s, k, 1) = \min_{x \in Set1(s,k)} ED(x). \quad \text{(Equation-31)}$$

A first bit $L_e$ block 520 can be coupled to the set1(2,1) minimum distance block 516 and a subsequent bit $L_e$ block 522 can be coupled to the set1($M_T$,$m_{M_T}$) minimum distance block 518. The first bit $L_e$ block 520 and the subsequent bit $L_e$ block 522 can determine the external output LLR for the k-th bit of symbol $x_s$ represented as Equation 32:

$$[ED^*(s,k,0) - ED^*(s,k,1) - L_a(s,k)]. \quad \text{(Equation-32)}$$

An MML end block 524 can be coupled to the first bit $L_e$ block 520 and the subsequent bit $L_e$ block 522. The MML end block 524 can combine an LLR 526 for all bits of the symbol $x_2$ for the two transmit case, and all bits of symbols $x_2, \ldots, x_{M_T}$ for the $M_T$ transmit case. Other parallel tracks 528 for calculating the LLR 526 for bits between the first bit of symbol $x_2$ and a last bit of a last symbol can also be coupled to the MML end block 524. The other parallel tracks 528 can compute the LLR 526 information for intermediate bits simultaneously to the computation of the LLR 526 information for the first and last bit in a symbol.

Figure 6:
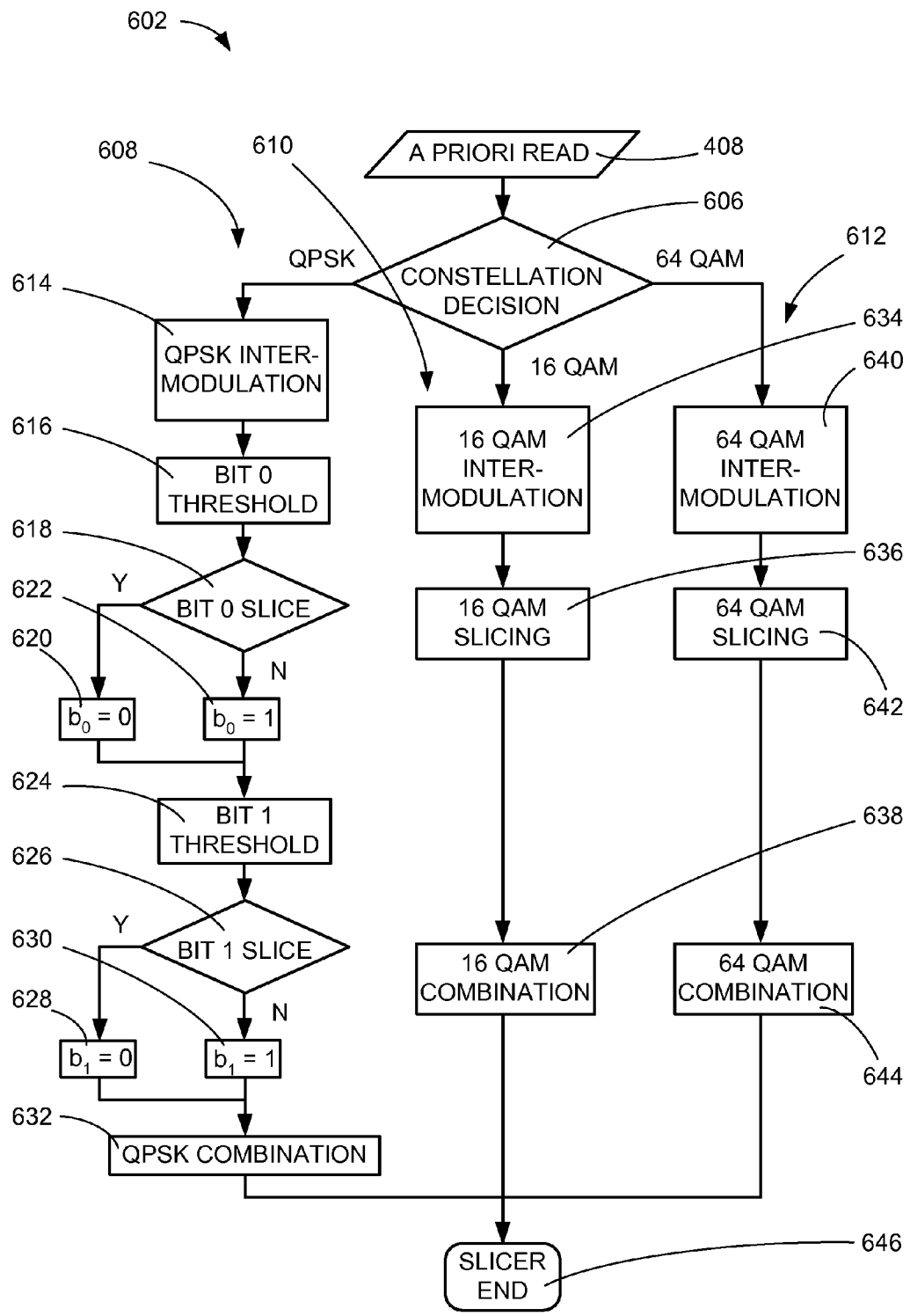
FIG. 6 is a flow chart of a slicing module for use in an embodiment of the present invention.

Referring now to FIG. 6, therein is shown a flow chart of a slicing module 602 for use in an embodiment of the present invention. The slicing module 602 can be implemented by the receiver system 201 of FIG. 2. More specifically, the slicing module 602 can be implemented by the detector block 202 of FIG. 2 or the detector block 302 of FIG. 3. The slicing module 602 can operate on, include, or be implemented as a physical hardware device.

The slicing module 602 design is applicable to dimensional reduction soft detectors. The slicing module 602 can be used for hard detection of a single spatial dimension. A priori information translates into offsets of decision thresholds. The thresholds for each bit and the decision process for each bit can be executed simultaneously or in parallel. The proposed design is optimal for QPSK and incurs only a small performance loss for higher order QAM modulations.

The slicing module 602 can be the estimating slice blocks 416 of FIG. 4. The slicing module 602 can include the a priori read block 408 to read prior information.

A constellation decision block 606 can direct a signal $\tilde{x}_1$ to a specialized slicer. This can be illustrated for example as a QPSK slicing track 608, a 16QAM slicing track 610, or a 64QAM slicing track 612.

A QPSK inter-modulation block 614 can be coupled to the constellation decision block 606 in the QPSK slicing track 608. The QPSK constellation can be represented by Equation 33:

$$X_{QPSK} = \{x_r + jx_i \mid x_r, x_i \in P(a, 1)\}, a = \frac{1}{\sqrt{2}}, \quad \text{(Equation-33)}$$

where a denotes half of the inter-modulation distance of the QPSK constellation.

A bit0 threshold block 616 can be coupled to the QPSK inter-modulation block 614. The bit0 threshold block 616 of the QPSK slicing track 608 can incorporate the $L_a(1,1)$ of the a priori read block 408. The bit0 threshold $\gamma_0$ can be represented as Equation 34:

$$\gamma_0 = -\frac{\sigma^2 L a(1, 1)}{4a \|h_1\|^2}, \quad \text{(Equation-34)}$$

where $\gamma_0$ is the decision threshold for bit0.

A bit0 slice block 618 can be coupled to the bit0 threshold block 616. The bit0 of a QPSK modulation corresponds to the real axis of a Gray coded constellation and is a binary phase shift keying (BPSK) modulation. The real axis is defined as the x axis of the constellation while the imaginary axis is defined as the y axis of the constellation. The first bit of the QPSK constellation can be determined as 0 by measuring against the threshold, represented by Equation 35:

$$Re(\tilde{x}_1) > \gamma_0. \quad \text{(Equation-35)}$$

If the condition is not satisfied, then the first bit of the QPSK constellation can be determined as 1. Coupled to the bit0 slice block 618 is a bit0=0 block 620 and a bit0=1 block 622.

A bit1 threshold block 624 can be coupled to the bit0=0 block 620 and the bit0=1 block 622. The bit1 threshold block 624 of the QPSK slicing track 608 can incorporate the $L_a(1,2)$ of the a priori read block 408. The bit1 threshold can be represented as Equation 36:

$$\gamma_1 = -\frac{\sigma^2 L a(1, 2)}{4a \|h_1\|^2}, \quad \text{(Equation-36)}$$

where $\gamma_1$ is the decision threshold for bit1.

A bit1 slice block 626 can be coupled to the bit1 threshold block 624. The bit1 of a QPSK modulation corresponds to the imaginary axis of a Gray coded constellation and is a BPSK modulation. The second bit of the QPSK constellation can be determined as 0 by measuring against the threshold, represented by Equation 37:

$$Im(\tilde{x}_1) > \gamma_1. \quad \text{(Equation-37)}$$

If the condition is not satisfied, then the second bit of the QPSK constellation can be determined as 1. Coupled to the bit1 slice block 626 is a bit1=0 block 628 and a bit1=1 block 630.

A QPSK combination block 632 can be coupled to the bit1=0 block 628 and the bit1=1 block 630. The QPSK combination block 632 can combine the bit0 with the bit1 into a symbol $x_1$.

A 16QAM inter-modulation block 634 can be coupled to the constellation decision block 606 in the 16QAM slicing track 610. The 16QAM constellation can be represented by Equation 38:

$$X_{16QAM} = \{x_r + jx_i \mid x_r, x_i \in P(a, 2)\}, a = \frac{1}{\sqrt{10}}, \quad \text{(Equation-38)}$$

where a denotes half of the inter-modulation distance of 16QPSK constellation.

A 16QAM slicing block 636 can be coupled to the 16QAM inter-modulation block 634. The 16QAM slicing block 636 can output bits 0-3 of a 16QAM symbol $x_1$.

A 16QAM combination block 638 can be coupled to the 16QAM slicing block 636. The 16QAM combination block 638 can combine the bits 0-3 to form a 16QAM symbol $x_1$.

A 64QAM inter-modulation block 640 can be coupled to the constellation decision block 606 in the 64QAM slicing track 612. The 64QAM constellation can be represented by Equation 39:

$$X_{64QAM} = \{x_r + jx_i \mid x_r, x_i \in P(a, 3)\}, a = \frac{1}{\sqrt{42}}, \quad \text{(Equation-39)}$$

where a denotes half of the inter-modulation distance of the 64QAM constellation.

A 64QAM slicing block 642 can be coupled to the 64QAM inter-modulation block 640. The 64QAM slicing block 642 can output bits 0-5 of a 64QAM symbol $x_1$.

A 64QAM combination block 644 can be coupled to the 64QAM slicing block 642. The 64QAM combination block 644 can combine the bits 0-5 to form a 64QAM symbol $x_1$. A slicer end block 646 can be coupled to the QPSK combination block 632, the 16QAM combination block 638, and the 64QAM combination block 644.

Referring now to FIG. 7, therein is shown a plot of a first quadrature phase-shift keying (QPSK) constellation 700 for use in an embodiment of the present invention. The first QPSK constellation 700 can form some or all of the multiple transmissions 110 of FIG. 1 and can be an AWGN system y=Ax+n where x belongs to a QPSK constellation, A is a real channel coefficient, and n is white Gaussian noise. The energy of the first QPSK constellation 700 can be represented by Equation 40:

$$E(|x|^2)=1. \qquad \text{(Equation-40)}$$

The first QPSK constellation 700 can have multiple symbols 702, each of the multiple symbols 702 can have a bit0 704 and a bit1 706. The first QPSK constellation 700 can be normalized, and the multiple symbols 702 neighboring each other are separated by a distance of 1.

A first symbol $x_1$ can be partitioned without a priori information by testing y/A against the following thresholds represented by Equation 41:

$$\text{Re}\left(\frac{y}{A}\right) \gtreqless 0, \text{Im}\left(\frac{y}{A}\right) \gtreqless 0. \qquad \text{(Equation-41)}$$

By combining the results of these threshold tests, one can easily determine the minimum ED estimate (also the maximum likelihood estimate) of x, $\hat{x}=\text{argmin}_x|y-Ax|^2$ efficiently.

The first QPSK constellation 700 can include Gray code 708. IDD receivers utilizing Gray code 708 perform inferior to anti-Gray coded IDD receivers; however, it has been discovered that utilizing the Gray code 708 can significantly reduce complexity by utilizing its standardized bit mapping while providing only slightly suboptimal performance.

The Gray code 708 is a symbol-to-bit mapping system that limits the transition between symbols to a single bit transition. Constellations utilizing the Gray code 708 have a unique bit layout that can be used to simplify the slicing of the QPSK symbols. The bit in the odd-position (first bit position) or the bit0 704 determines the real part or axis of the modulation. The real axis is defined as the x axis of the QPSK constellation 700. The bit in the even-position (second bit position) or the bit1 706 determines the imaginary part or axis of the modulation.

The first QPSK constellation 700 is shown having a line 7-7 that divides the positive and the negative portions of the real axis. The bits in the first bit positions or the bit0 704 can be shown as having a value of zero to the right of the line 7-7 but a value of 1 to the left of line 7-7.

It has been discovered that exploiting the bit positions and symbol structure of the Gray code 708 can reduce complexity of the detector block 202 of FIG. 2 by bifurcating the calculation of the real and imaginary axis. It has also been discovered that exploiting the bit positions and the symbol structure of the Gray code 708 can reduce complexity of the detector block 202 of FIG. 2.

Referring now to FIG. 8, therein is shown a plot of a second QPSK constellation 800 for use in an embodiment of the present invention. The second QPSK constellation 800 can form some or all of the multiple transmissions 110 of FIG. 1 and can have multiple symbols 802, each of the multiple symbols 802 can have a bit0 804 and a bit1 806. The second QPSK constellation 800 can be normalized, and the multiple symbols 802 neighboring each other are separated by a distance of 1.

A line 8-8 is shown dividing the second QPSK constellation 800 along the center of the imaginary axis. The bit1 806 in the second bit position is shown having a value of 0 above the line 8-8 and a value of 1 below the line 8-8. The transmit symbols can be sliced by sign in the real and imaginary dimension based on the bit0 804 and the bit1 806, respectively, without regard to magnitude.

Referring now to FIG. 9, therein is shown a plot for a BPSK cost function 900 without a priori information. The BPSK cost function 900 can represent the first QPSK constellation 700 of FIG. 7 and the second QPSK constellation 800 of FIG. 8. The BPSK cost function 900 can further include a bit0 cost function 902 and a bit1 cost function 904.

The bit0 cost function 902 and the bit1 cost function 904 are shown versus $\text{Re}(h_1^H(y-h_2x_2))$ when there is no a priori information. The BPSK cost function 900 have a normalized average energy of 1 and a decision threshold at 0. The bit0 cost function 902 has a zero at $$+\frac{1}{\sqrt{2}},$$

which is also half of the inter-modulation distance from the zero. The bit1 cost function 904 has a zero at $$-\frac{1}{\sqrt{2}},$$

which is also half of the inter-modulation distance from the zero.

Since the decision threshold is at 0, $\hat{x}_1$ can be chosen as bit0 when $\text{Re}(h_1^H(y-h_2x_2))$ is positive and bit1 when it is negative. The BPSK cost function 900 are used to show the real dimensions only, and it should be understood that extension to the imaginary dimension is trivial and done in the same manner.

Figure 10:
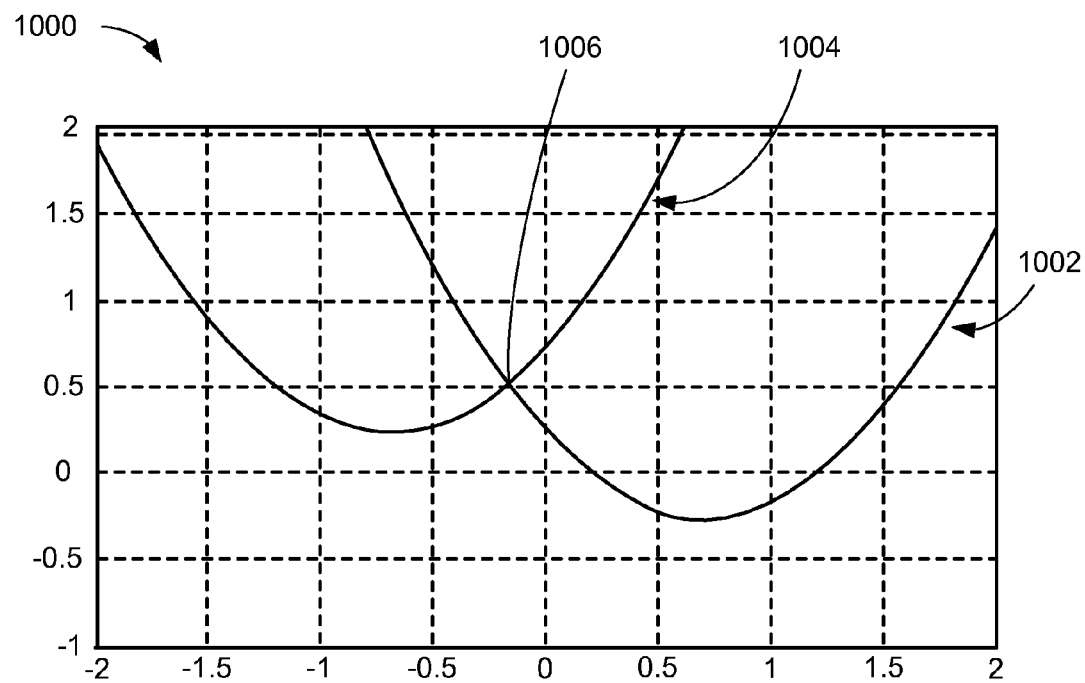
FIG. 10 is a second plot for a BPSK cost function with a priori information for use in an embodiment of the present invention.

Referring now to FIG. 10, therein is shown a second plot for a BPSK cost function 1000 with a priori information for use in an embodiment of the present invention. The BPSK cost function 1000 can represent the first QPSK constellation 700 of FIG. 7 and the second QPSK constellation 800 of FIG. 8. The BPSK cost function 1000 can be shown as a bit0 cost function 1002 and a bit1 cost function 1004 that incorporate a priori information.

Incorporating a priori information into a max-log-MAP is exceedingly difficult and prohibitively complicated since boundaries or decision thresholds are no longer valid due to the a priori information. However, the boundaries of the slicing regions can be adjusted based on the a priori information and the boundaries can be based on a closed-form formula of prior information because Gray coding only allows one bit to switch between neighboring modulation symbols.

The max-log-MAP problem must first be rewritten as Equation 42:

$$\max_{x \in \chi_0} -\frac{1}{\sigma^2}\|y-Hx\|^2 + \frac{1}{2}h(x)^T L_a. \qquad \text{(Equation-42)}$$

Testing every candidate $x_2$, for each given $x_1$ allows the problem to be simplified as Equation 43:

$$\hat{x}_1(x_2) = \qquad \text{(Equation-43)}$$
$$\text{argmax}_{\tilde{x}_1} -\frac{1}{\sigma^2}\|y-h_1\tilde{x}_1-h_2x_2\|^2 + \frac{1}{2}b(\tilde{x}_1)^T L_a(x_1).$$

A slight abuse of notation for $L_a(x_1)$ can represent the vector of a priori LLRs for the bits for $x_1$ and (Equation-43) can be simplified as Equation 44:

$$\hat{x}_1(x_2) = \operatorname{argmax}_{\tilde{x}_1} - \frac{\|h_1\|^2}{\sigma^2 \|h_1\|^2} \|y - h_1 \tilde{x}_1 - h_2 x_2\|^2 + \frac{1}{2} b(\tilde{x}_1)^T L_a(x_1) = \operatorname{argmax}_{\tilde{x}_1} - \frac{\|h_1\|^2}{\sigma^2} \left\| \frac{h_1^H}{\|h_1\|^2} (y - h_2 x_2) - \tilde{x}_1 \right\|^2 + \frac{1}{2} b(\tilde{x}_1)^T L_a(x_1). \quad \text{(Equation-44)}$$

This equation can be referred to as the cost function. Without a priori information, it can be understood as selecting $\tilde{x}_1$ to minimize the distance between $$\frac{h_1^H (y - h_2 x_2)}{\|h_1\|^2}$$

and $\tilde{x}_1$ as shown in FIG. 9.

It has been discovered that the cost function of (Equation-44) greatly reduces the complexity of incorporating, the LLR of the a priori read block 408 of FIG. 4, information into the slicing module 602 of FIG. 6 by allowing the, LLR 526 of FIG. 5, information to serve as offsets. Further, the cost function of (Equation-44) greatly reduces the complexity of the slicing module 602 of FIG. 6 or the estimating slice blocks 416 of FIG. 4 by allowing the separation of the real and imaginary dimensions of the multiple transmissions 110 of FIG. 1 and the real and imaginary parts of $\hat{x}_1(x_2)$ can be determined separately, which allows the consideration of only a signal PAM constellation rather than the entire QPSK, 16QAM, 64QAM, or other similar constellations.

The bit0 cost function 1002 and the bit1 cost function 1004 have been calculated based on the cost function and depicts a prior LLR L of 0.5, as an example. According to one implementation (where bits with a value of 1 correspond to a −1 and bits with a value of 0 correspond to a +1), when the LLR is positive the bit is more likely to be a value of 0. This can be seen by the shift of an intersection 1006 of the bit0 cost function 1002 and the bit1 cost function 1004 to the left.

It has been discovered that by equating the cost function of (Equation-44) for the two BPSK cost function 1000 to calculate a new threshold substantially reduces complexity. After simplifying, the threshold is represented by Equation 45:

$$\operatorname{Re}(h_1^H(y - h_2 x_2)) \gtreqless -\frac{\sqrt{2} L \sigma^2}{4}. \quad \text{(Equation-45)}$$

This indicates that when L is positive, the value of the bit is more likely to be 0 and the threshold moves to the left.

Further, it has been discovered that it is possible to modify a slicing function Q(x) to allow the receiver block 104 of FIG. 1 to perform max-log-MAP detection similar to when no prior information is available. The solution to the problem of selecting $\hat{x}_1$ given $\tilde{x}_1$ is represented by Equation 46:

$$\hat{x}_1 = Q(\tilde{x}_1) = \operatorname{argmin}_{\bar{x}_1 \in X_1} \left\{ \frac{\|h_1\|^2}{\sigma^2} ((\mathcal{R}(\tilde{x}_1 - \bar{x}_1))^2 + (I(\tilde{x}_1 - \bar{x}_1))^2) - \sum_{i=1}^{m_1} \frac{1}{2} b(X_{1,i}^{-1}(\bar{x}_1)) L_a(1, i) \right\}. \quad \text{(Equation-46)}$$

It has been discovered that utilizing the slicing module 602 of FIG. 6 to slice based on offsetting a decision threshold by (Equation-46) provides a significantly less complicated mapping function since only prior information for $x_1$ is present and the contribution for prior information for other layers is constant and does not affect the optimization. It has further been discovered that utilizing the slicing module 602 of FIG. 6 to slice based on offsetting a decision threshold by (Equation-46) provides a significantly less complicated mapping function since the summation terms with odd i indices that these terms are only affected by $\mathfrak{R}(\bar{x}_1)$ and not $\mathfrak{I}(\bar{x}_1)$, while terms with even i indices are only affected by $\mathfrak{I}(\bar{x}_1)$ and not $\mathfrak{R}(\bar{x}_1)$. That allows the optimization problem to decouple into two subproblems, one for finding $\mathfrak{R}(\bar{x}_1)$ and the other for finding $\mathfrak{I}(\bar{x}_1)$.

Due to symmetry, and clarity of explanation only the problem with finding $\mathfrak{R}(\bar{x}_1)$ is shown but those of ordinary skill in the art would be able to expand the explanation of the real dimension to the imaginary dimension. The prior information $L_a(1,1)$ can be a constant in (Equation-46). By substituting $R(\bar{x}_1)$=+a or $R(\bar{x}_1)$=−a, (Equation-46) becomes two parabolas with the bit1 cost function 1004 and the bit0 cost function 1002 for the variable $R(\tilde{x}_1)$ with different centers (+a and −a) and different vertical shifts.

The slicing functions parabolas $f_1(x) = A(x - c_1)^2 + B_1$ and $f_2(x) = A(x - c_2)^2 + B_2$ with $c_1 \neq c_2$ intersect at exactly one point. The proof can be represented as Equation 47:

$$\text{Set } f_1(x) = f_2(x) \text{ yields } x = \frac{c_1 + c_2}{2} + \frac{B_2 - B_1}{2A(c_2 - c_1)}. \quad \text{(Equation-47)}$$

It has been discovered that given any two PAM modulation symbols $w_1, w_2 \in R(X_1)$ with $w_1 < w_2$, there is a unique point $c(w_1, w_2)$, such that (Equation-46) has a smaller value with $R(\bar{x}_1) = w_1$ when $R(\tilde{x}_1) < c(w_1, w_2)$, and has a smaller value with $R(\bar{x}_1) = w_2$ otherwise.

The optimal $\bar{x}_1$ for (Equation-45) can be determined by defining quantization regions for $R(\tilde{x}_1)$. The boundary point and the slicing function Q(x) for QPSK are represented by Equations 48 and 49:

$$\gamma_1 \triangleq -\frac{\sigma^2 L_a(1,1)}{4a \|h_1\|^2}, \quad \text{(Equation-48)}$$

$$Q_1^{\mathcal{R}}(x) = \begin{cases} 0 & \text{if } \mathcal{R}(x) > \gamma_1 \\ 1 & \text{if } \mathcal{R}(x) < \gamma_1. \end{cases} \quad \text{(Equation-49)}$$

When $L_a(1,1) > 0$, the corresponding bit is more likely to be 0, which pushes the decision boundary to the negative direction.

Figure 11:
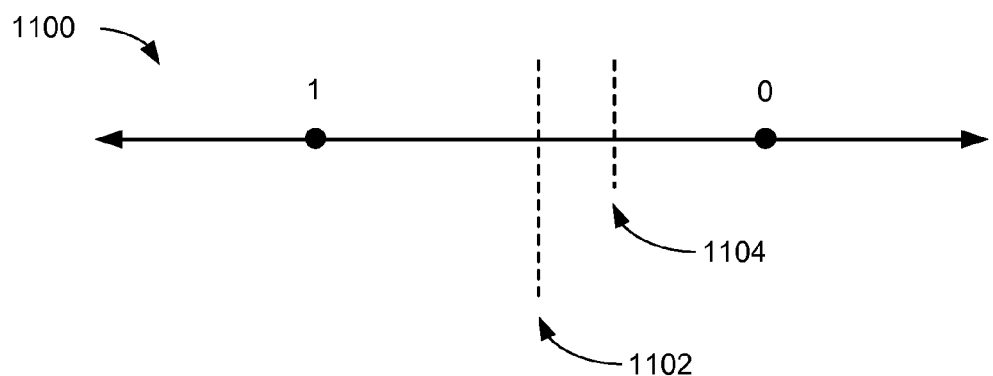
FIG. 11 is a partitioning plot for a BPSK for use in an embodiment of the present invention.

Referring now to FIG. 11, therein is shown a partitioning plot for a BPSK 1100 for use in an embodiment of the present invention. The BPSK 1000 can be real bits of the first QPSK constellation 700 of FIG. 7, or the real bits of the second QPSK constellation 800 of FIG. 8. The partitioning plot only considers the BPSK 1100 of the real dimension since the real and imaginary dimensions can be separated in a QPSK symbol and one QPSK dimension is the BPSK 1100.

A threshold 1102 for the case of no prior LLR's and an a priori shifted threshold 1104 are shown along the real dimension of a QPSK symbol $x_2$ being converted to an AWGN system by MRC, represented as Equation 50:

$$R\left(\frac{h_1^H(y - h_2 x_2)}{\|h_1\|^2}\right) \quad \text{(Equation-50)}$$

The threshold 1102 and the a priori shifted threshold 1104 can be shown between a bit value of 1 and a bit value of 0. The optimal decision rule for slicing $x_2$ is represented by Equation 51:

$$Q_1^R\left(\frac{h_1^H(y - h_2 x_2)}{\|h_1\|^2}\right), \quad \text{(Equation-51)}$$

where Equation 52:

$$Q_1^R(x) = \begin{cases} 0 & \text{if } R(x) > \gamma_1 \\ 1 & \text{if } R(x) < \gamma_1, \end{cases} \quad \text{(Equation-52)}$$

$$\gamma_1 = -\frac{\sigma^2 L_a(b_k)}{4a\|h_1\|^2}.$$

The threshold 1102 can be shown centered and not offset when $L_a(b_k)=0$, while the a priori shifted threshold 1104 is shown offset for $L_a(b_k)<0$. The offset of the a priori shifted threshold 1104 indicates that the value of the bit is more likely to be 1 as the threshold moves to the right.

Figure 12:
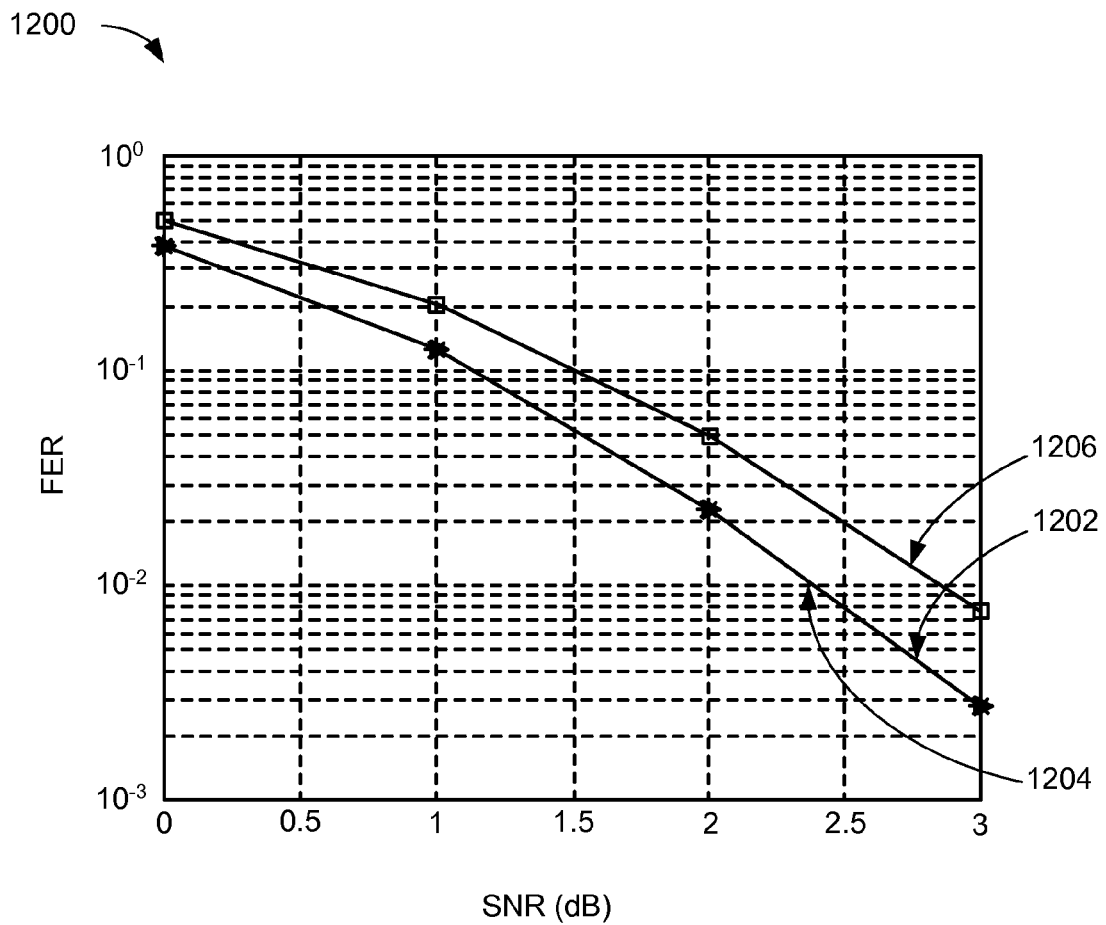
FIG. 12 is a frame error rate (FER) of a QPSK performance plot for an embodiment of the present invention.

Referring now to FIG. 12, therein is shown a frame error rate (FER) of a QPSK performance plot 1200 for an embodiment of the present invention. The FER performance plot can be the FER performance of the receiver block 104 for receiving the multiple transmissions 110 of FIG. 1. The QPSK performance plot 1200 is shown with the slicing technique under realistic channel conditions for an Long Term Evolution (LTE) system. A simple iteration plot 1202 showing the slicing technique is shown against an optimal iteration plot 1204 showing the optimal selection of the hard detection, and against a single-pass plot 1206 showing the ML detection without prior information. Only two global iterations are simulated.

The important parameters of the simulation included: Band width of 10 MHz, fast fourier transform (FFT) size of 1024, Subcarriers 600, MIMO of 2×2, modulation QPSK, Channel Model of extended vehicular A, and Doppler frequency of 70 Hz. The simple iteration plot 1202 is shown overlapping the optimal iteration plot 1204 indicating no signal degradation between the optimal and simplified slicing methods.

It has been discovered that utilizing the slicing module 602 of FIG. 6 to slice with the a priori shifted threshold 1104 of FIG. 11 results in optimal performance with significantly decreased complexity for the QPSK constellations.

Figure 13:
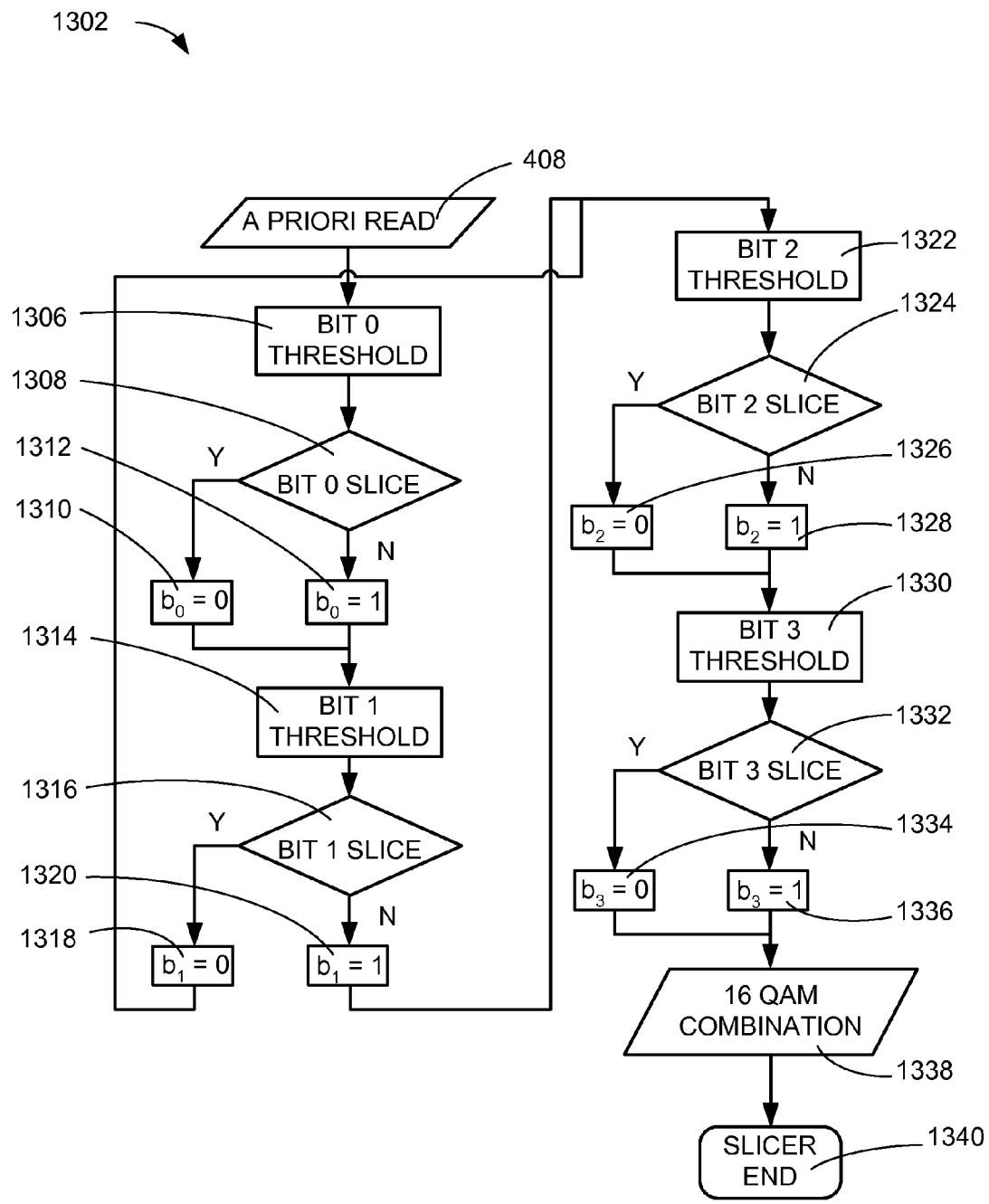
FIG. 13 is a flow chart of a quadrature amplitude modulation 16 (16QAM) slicing module for use in an embodiment of the present invention.

Referring now to FIG. 13, therein is shown a flow chart of a 16QAM slicing module 1302 for use in an embodiment of the present invention. The 16QAM slicing module 1302 can be implemented by the receiver system 201 of FIG. 2. More specifically, the 16QAM slicing module 1302 can be implemented by the detector block 202 of FIG. 2 or the detector block 302 of FIG. 3. The 16QAM slicing module 1302 can operate on, include, or be implemented as a physical hardware device.

The 16QAM slicing module 1302 can include the a priori read block 408 coupled to the 16QAM inter-modulation block 634 of FIG. 6. The a priori read block 408 can read the a priori information of a first signal $x_1$ as $K(x_1)$ and a.

A bit0 threshold block 1306 can be coupled to the a priori read block 408. The bit0 threshold block 1306 of the 16QAM slicing track 610 of FIG. 6 can incorporate the $L_a(1,1)$ of the a priori read block 408. The bit0 threshold can be represented as Equation 53:

$$\gamma_0 = -\frac{\sigma^2 La(1, 1)}{4a\|h_1\|^2}, \quad \text{(Equation-53)}$$

where $\gamma_0$ is the decision threshold for bit0.

A bit0 slice block 1308 can be coupled to the bit0 threshold block 1306. The bit0 of a 16QAM modulation corresponds to the real axis of a Gray coded constellation. Since Gray coding uses the odd bits (bit0 and bit2) for the real axis of the 16QAM, the odd bits can be considered a 4PAM. The real axis is defined as the x axis of a constellation while the imaginary axis is defined as the y axis of a constellation. The first bit of the 4PAM modulation can be determined as 0 by measuring against the threshold, represented by Equation 54:

$$Re(K(x_1)) > \gamma_0. \quad \text{(Equation-54)}$$

If the condition is not satisfied, then the first bit of the 4PAM modulation can be determined as 1. Coupled to the bit0 slice block 1308 is a bit0=0 block 1310 and a bit0=1 block 1312.

A bit1 threshold block 1314 can be coupled to the bit0=0 block 1310 and the bit0=1 block 1312. The bit1 threshold block 1314 can incorporate the $L_a(1,2)$ of the a priori read block 408. The bit1 threshold can be represented as Equation 55:

$$\gamma_1 = -\frac{\sigma^2 La(1, 2)}{4a\|h_1\|^2}, \quad \text{(Equation-55)}$$

where $\gamma_i$ is the decision threshold for bit1.

A bit1 slice block 1316 can be coupled to the bit1 threshold block 1314. The bit1 of a 16QAM modulation corresponds to the sign value on an imaginary axis of a Gray coded constellation. Since Gray coding uses the even positioned bits (bit1 and bit3) for the imaginary axis of the 16QAM, the even bits can be considered a 4PAM. The second bit of the 4PAM modulation can be determined as 0 by measuring against the threshold, represented by Equation 56:

$$Im(\tilde{x}_1) > \gamma_1. \quad \text{(Equation-56)}$$

If the condition is not satisfied, then the second bit of the 4PAM modulation can be determined as 1. Coupled to the bit1 slice block 1316 is a bit1=0 block 1318 and a bit1=1 block 1320.

A bit2 threshold block 1322 can be coupled to the bit1=0 block 1318 and the bit1=1 block 1320. The bit2 threshold block 1322 of the 16QAM slicing track 610 of FIG. 6 can incorporate the $L_a(2)$ of the estimation module 402 of FIG. 4. The bit2 threshold can be represented as Equation 57:

$$\gamma_2 = 2a + \frac{\sigma^2 La(2)}{4a\|h_1\|^2}, \quad \text{(Equation-57)}$$

where $\gamma_2$ is the decision threshold for bit2.

A bit2 slice block 1324 can be coupled to the bit2 threshold block 1322. The bit2 of a 16QAM modulation corresponds to the magnitude value on a real axis of a Gray coded constellation irrespective of the sign value since the Gray coded constellation is symmetric about the center for bit2 and bit3 for 16QAM. The third bit of the 4PAM modulation can be determined as 0 by measuring against the threshold, represented by Equation 58:

$$|Re(K(x_1))| \leq \gamma_2. \quad \text{(Equation-58)}$$

If the condition is not satisfied, then the third bit of the 4PAM modulation can be determined as 1. Coupled to the bit2 slice block 1324 is a bit2=0 block 1326 and a bit2=1 block 1328.

A bit3 threshold block 1330 can be coupled to the bit2=0 block 1326 and the bit2=1 block 1328. The bit3 threshold block 1330 can incorporate the $L_a(3)$ of the estimation module 402 of FIG. 4. The bit3 threshold can be represented as Equation 59:

$$\gamma_3 = 2a + \frac{\sigma^2 La(3)}{4a\|h_1\|^2}, \quad \text{(Equation-59)}$$

where $\gamma_3$ is the decision threshold for bit3.

A bit3 slice block 1332 can be coupled to the bit3 threshold block 1330. The bit3 of a 16QAM modulation corresponds to the magnitude value on an imaginary axis of a Gray coded constellation. The fourth bit of the 4PAM modulation can be determined as 0 by measuring against the threshold, represented by Equation 60:

$$|Im(K(x_1))| \leq \gamma_3. \quad \text{(Equation-60)}$$

If the condition is not satisfied, then the fourth bit of the 4PAM modulation can be determined as 1. Coupled to the bit3 slice block 1332 is a bit3=0 block 1334 and a bit3=1 block 1336.

A 16QAM combination block 1338 can be coupled to the bit3=0 block 1334 and the bit3=1 block 1336. The 16QAM combination block 1338 can combine the bit0, the bit1, the bit2, and the bit3 into a symbol $x_2$. A slicer end block 1340 can be coupled to the 16QAM combination block 1338.

Figure 14:
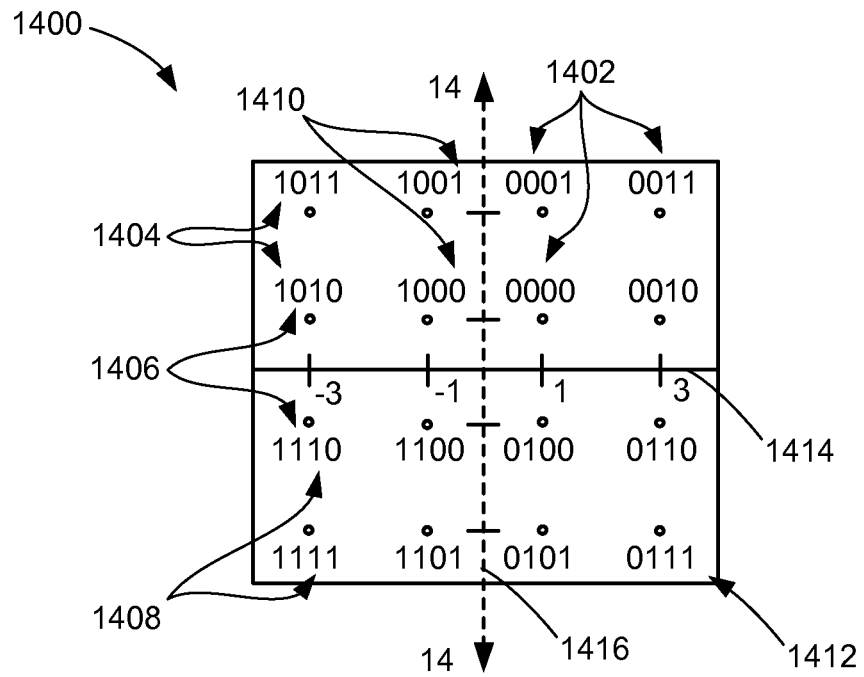
FIG. 14 is a plot of a first 16QAM constellation for use in an embodiment of the present invention.

Referring now to FIG. 14, therein is shown a plot of a first 16QAM constellation 1400 for use in an embodiment of the present invention. The first 16QAM constellation 1400 can form some or all of the multiple transmissions 110 of FIG. 1 and can be an AWGN system y=Ax+n where x belongs to a general 16QAM constellation, A is a complex channel coefficient, and n is white Gaussian noise. The energy of the first 16QAM constellation 1400 can be represented by Equation 61:

$$E(|x|^2)=1. \quad \text{(Equation-61)}$$

The first 16QAM constellation 1400 can have multiple symbols 1402, each of the multiple symbols 1402 can have a bit0 1404, a bit1 1406, a bit2 1408, and a bit3 1410. The first QPSK constellation 1400 can be normalized, and the multiple symbols 1402 neighboring each other are separated by a distance of 2a.

A first symbol $x_1$ can be partitioned without a priori information by testing y/A against the following thresholds represented by Equation 62:

$$Re\left(\frac{y}{A}\right) \geq 0, Im\left(\frac{y}{A}\right) \geq 0. \quad \text{(Equation-62)}$$

By combining the results of these threshold tests, one can easily determine the minimum ED estimate (also the maximum likelihood estimate) of x, $\hat{x}=\text{argmin}_x|y-Ax|^2$ efficiently.

The first 16QAM constellation 1400 can include Gray code 1412. The Gray code 1412 is a symbol-to-bit mapping system that limits the transition between symbols to a single bit transition. Constellations utilizing the Gray code 1412 have a unique bit layout that can be used to simplify the slicing of the 16QAM symbols. The bit in the odd-position (first bit position and third bit position) or the bit0 1404 and the bit2 1408, respectively, determines the real dimension 1414 or axis of the modulation.

The real axis is defined as the x axis of the first 16QAM constellation 1400. The bit in the even-position (second bit position and fourth bit position) or the bit1 1406 and the bit3 1410, respectively, determines the imaginary dimension 1416 or axis of the modulation.

The first 16QAM constellation 1400 is shown having a line 14-14 that divides the positive and the negative portions of the real axis. The bits in the first positions or the bit0 1404 can be shown as having a value of zero to the right of the line 14-14 but a value of 1 to the left of line 14-14. The bit0 1404 can correspond to a sign value in the real axis without regard to magnitude.

It has been discovered that exploiting the bit positions and symbol structure of the Gray code 1412 can reduce complexity of the detector block 202 of FIG. 2 by bifurcating the calculation of the real and imaginary axis. It has also been discovered that exploiting the bit positions and symbol structure of the Gray code 1412 can reduce complexity of the detector block 202 of FIG. 2.

Figure 15:
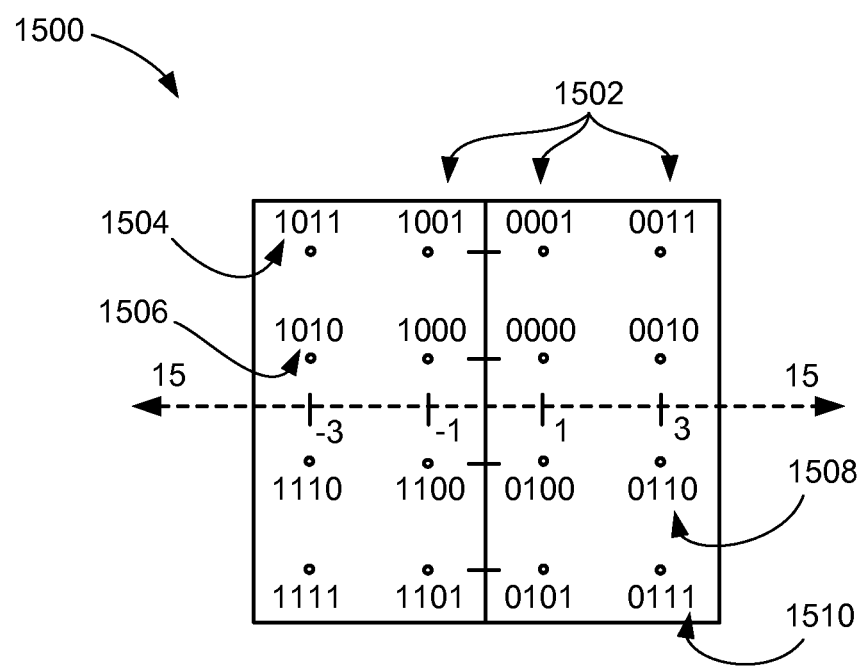
FIG. 15 is a plot of a second 16QAM constellation for use in an embodiment of the present invention.

Referring now to FIG. 15, therein is shown a plot of a second 16QAM constellation 1500 for use in an embodiment of the present invention. The second 16QAM constellation 1500 can form some or all of the multiple transmissions 110 of FIG. 1 and can have multiple symbols 1502, each of the multiple symbols 1502 can have a bit0 1504, a bit1 1506, a bit2 1508, and a bit3 1510. The second 16QAM constellation 1500 can be normalized, and the multiple symbols 1502 neighboring each other are separated by a distance of 2a.

A line 15-15 is shown dividing the second 16QAM constellation 1500 along the imaginary axis. The bit1 1506 in the second bit position is shown having a value of 0 above the line 15-15 and a value of 1 below the line 15-15. The transmit symbols can be sliced by sign in the real and imaginary dimension based on the bit0 1504 and the bit1 1506, respectively, without regard to magnitude.

Figure 16:
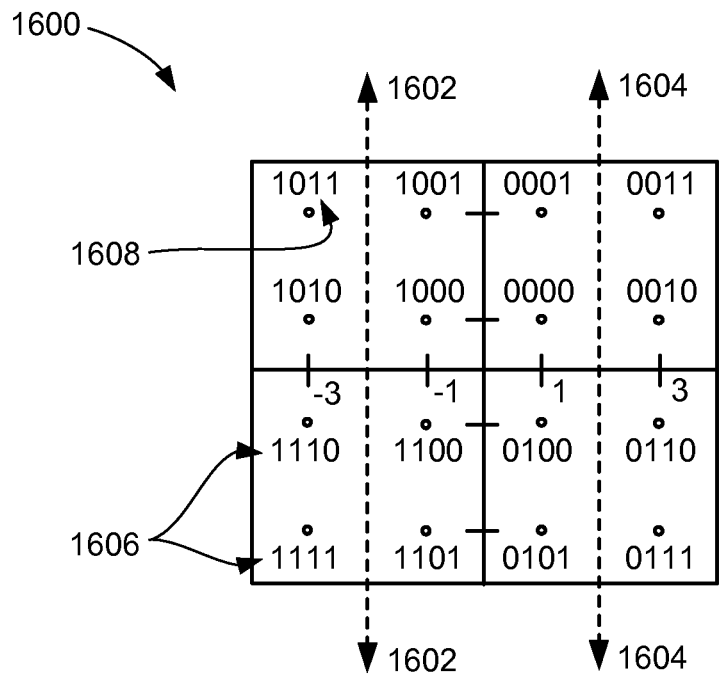
FIG. 16 is a plot of a third 16QAM constellation for use in an embodiment of the present invention.

Referring now to FIG. 16, therein is shown a plot of a third 16QAM constellation 1600 for use in an embodiment of the present invention. The third 16QAM constellation 1600 can form some or all of the multiple transmissions 110 of FIG. 1 and can be shown having a threshold at ±2a along a real axis and depicted by a first line 1602-1602 at a position of −2a and a second line 1604-1604 at a position of +2a.

The third 16QAM constellation 1600 is shown having multiple symbols 1606. The multiple symbols 1606 are shown having a bit2 1608 in the third bit position. The third 16QAM constellation 1600 can utilize the Gray coding. Gray coding allows the bit2 1608 to be symmetrical about the center of the real axis. The bit2 1608 can be determined without respect to the sign value of the bit2 1608 modulation value.

This can be illustrated for example by the bit2 1608 having a bit value of 0 when the bit2 1608 is located between the first line 1602-1602 and the second line 1604-1604. This can be further illustrated for example by the bit2 1608 having a bit value of 1 when the bit2 1608 is located to the left of the first line 1602-1602 and to the right of the second line 1604-1604.

Figure 17:
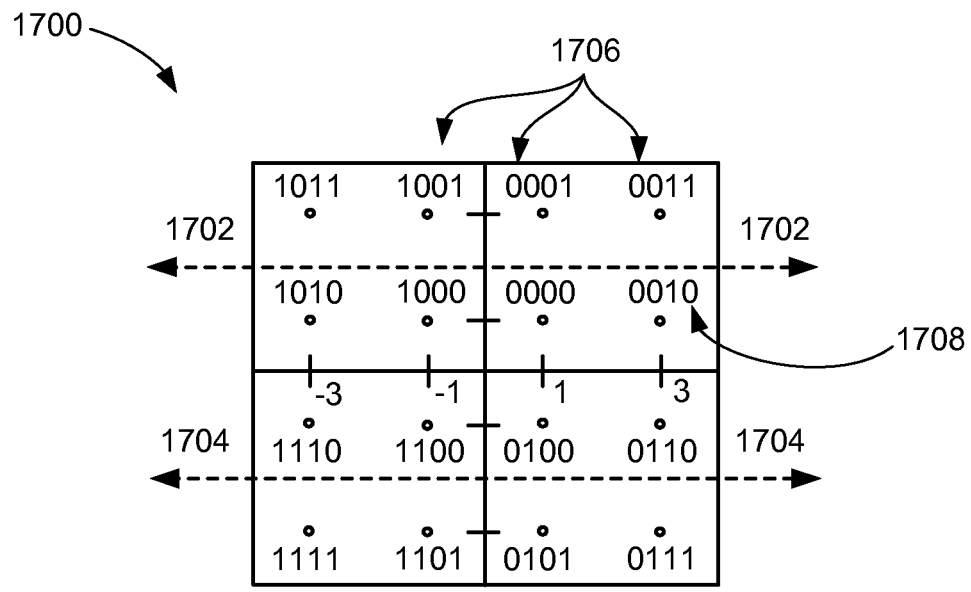
FIG. 17 is a plot of a fourth 16QAM constellation for use in an embodiment of the present invention.

Referring now to FIG. 17, therein is shown a plot of a fourth 16QAM constellation 1700 for use in an embodiment of the present invention. The fourth 16QAM constellation 1700 can form some or all of the multiple transmissions 110 of FIG. 1 and can be shown having a threshold at ±2a along an imaginary axis and depicted by a first line 1702-1702 at a position of +2a and a second line 1704-1704 at a position of −2a.

The fourth 16QAM constellation 1700 is shown having multiple symbols 1706. The multiple symbols 1706 are shown having a bit3 1708 in the fourth bit position. The fourth 16QAM constellation 1700 can utilize the Gray coding. Gray coding allows the bit3 1708 to be symmetrical about the center of the imaginary axis. The bit3 1708 can be determined without respect to the sign value of the bit3 1708 modulation value.

This can be illustrated for example by the bit3 1708 having a bit value of 0 when the bit3 1708 is located between the first line 1702-1702 and the second line 1704-1704. This can be further illustrated for example by the bit3 1708 having a bit value of 1 when the bit3 1708 is located above the first line 1702-1702 or to below the second line 1704-1704.

Referring now to FIG. 18-21, therein is shown 4 possible cases where the optimal threshold for the first bit is the intersection of parabolas centered at 11 and 00, 10 and 01, 11 and 01, and 10 and 00.

Figure 18:
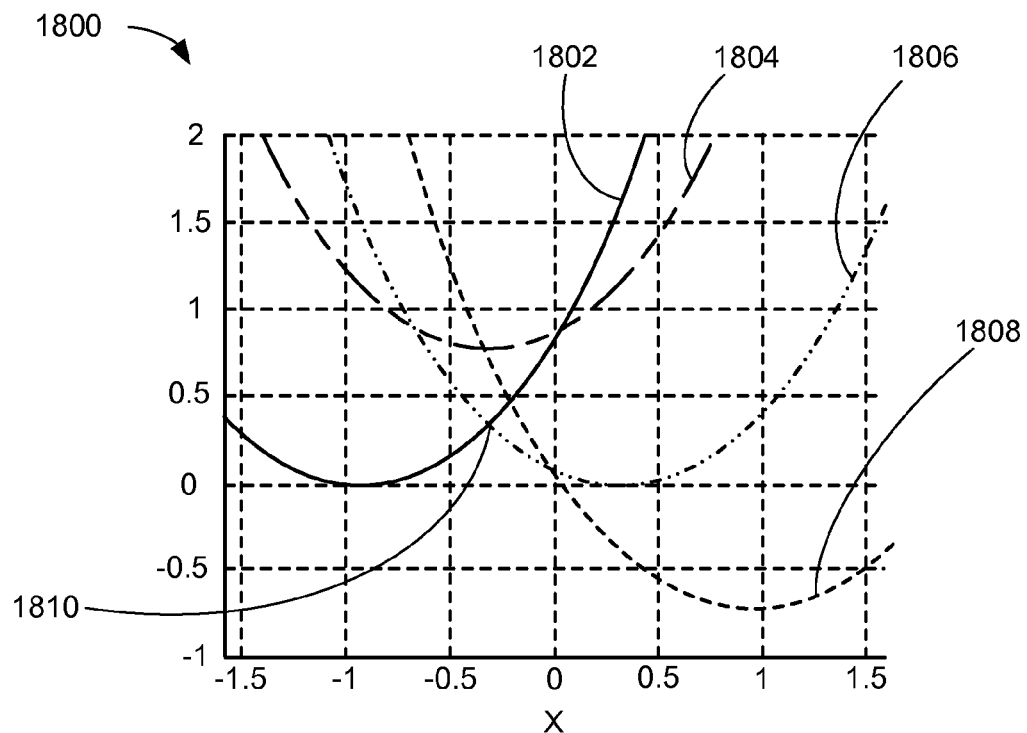
FIG. 18 is a first plot for a 16QAM cost function for use in an embodiment of the present invention.

Referring now to FIG. 18, therein is shown a first plot for a 16QAM cost function 1800 for use in an embodiment of the present invention. The 16QAM cost function 1800 can represent the first 16QAM constellation 1400 of FIG. 14, the second 16QAM constellation 1500 of FIG. 15, the third 16QAM constellation 1600 of FIG. 16, and the fourth 16QAM constellation 1700 of FIG. 17. The first cost function plot is shown having an 11 cost function 1802 centered at 11, a 10 cost function 1804 centered at 10, a 00 cost function 1806 centered at 00, and a 01 cost function 1808 centered at 01.

A first $T_{A,B}$ 1810 centered at the intersection of the 11 cost function 1802 and the 00 cost function 1806 is shown and has a value of $T_{11,00}$. The first $T_{A,B}$ 1810 is a first optimal threshold for the first bit in a 16QAM constellation symbol and is defined as the intersection point of the parabolas centered at A and B, which can be calculated in closed form.

Figure 19:
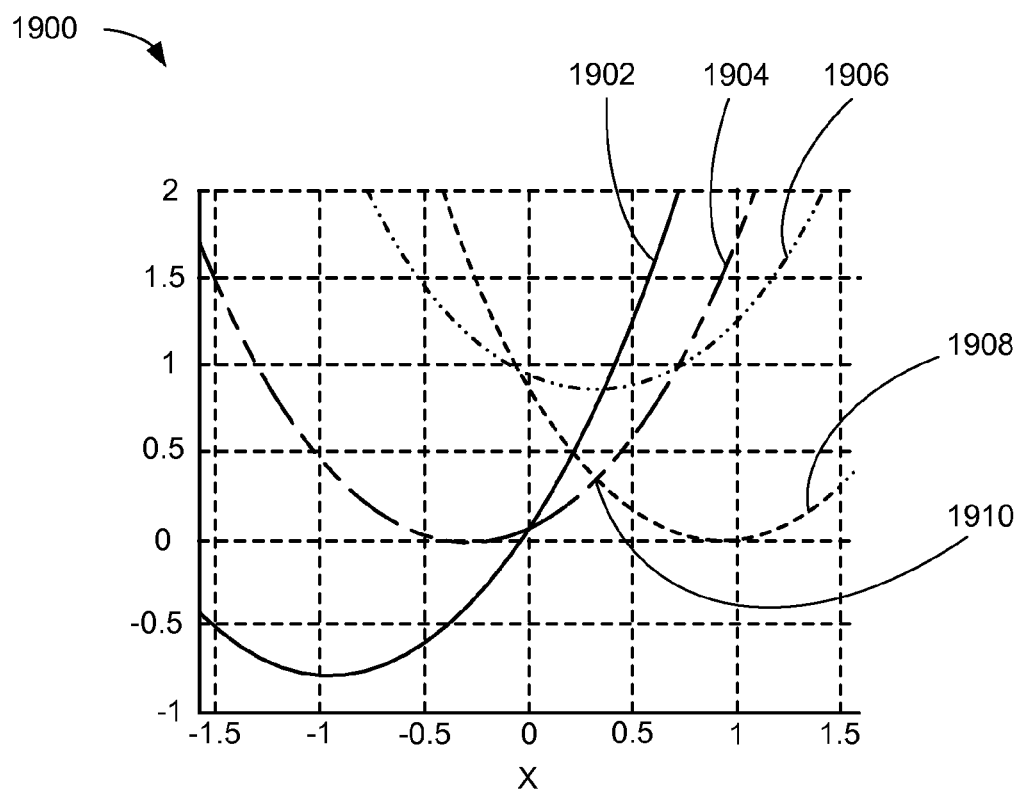
FIG. 19 is a second plot for a 16QAM cost function for use in an embodiment of the present invention.

Referring now to FIG. 19, therein is shown a second plot for a 16QAM cost function 1900 for use in an embodiment of the present invention. The 16QAM cost function 1900 can represent the first 16QAM constellation 1400 of FIG. 14, the second 16QAM constellation 1500 of FIG. 15, the third 16QAM constellation 1600 of FIG. 16, and the fourth 16QAM constellation 1700 of FIG. 17. The second cost function plot is shown having an 11 cost function 1902 centered at 11, a 10 cost function 1904 centered at 10, a 00 cost function 1906 centered at 00, and a 01 cost function 1908 centered at 01.

A second $T_{A,B}$ 1910 centered at the intersection of the 10 cost function 1904 and the 01 cost function 1908 is shown and has a value of $T_{10,01}$. The second $T_{A,B}$ 1910 is a second optimal threshold for the first bit in a 16QAM constellation symbol and is defined as the intersection point of the parabolas centered at A and B, which can be calculated in closed form.

Figure 20:
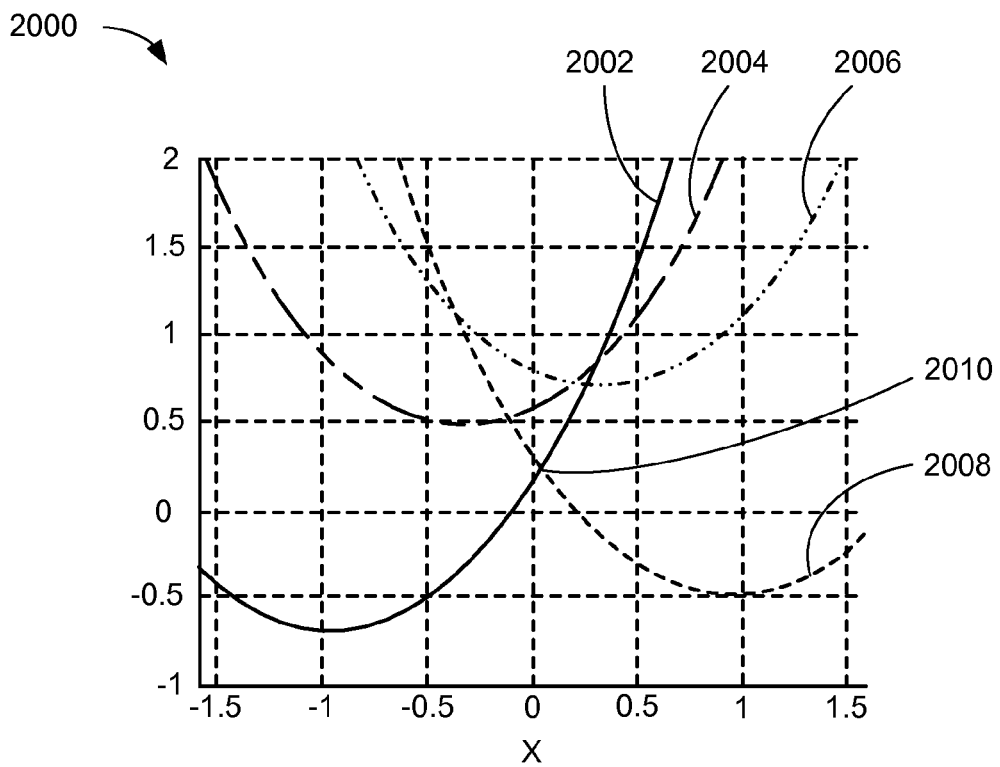
FIG. 20 is a third plot for a 16QAM cost function for use in an embodiment of the present invention.

Referring now to FIG. 20, therein is shown a third plot for 16QAM cost function 2000 for use in an embodiment of the present invention. The 16QAM cost function 2000 can represent the first 16QAM constellation 1400 of FIG. 14, the second 16QAM constellation 1500 of FIG. 15, the third 16QAM constellation 1600 of FIG. 16, and the fourth 16QAM constellation 1700 of FIG. 17. The third cost function plot is shown having an 11 cost function 2002 centered at 11, a 10 cost function 2004 centered at 10, a 00 cost function 2006 centered at 00, and a 01 cost function 2008 centered at 01.

A third $T_{A,B}$ 2010 centered at the intersection of the 11 cost function 2002 and the 01 cost function 2008 is shown and has a value of $T_{11,01}$. The third $T_{A,B}$ 2010 is a third optimal threshold for the first bit in a 16QAM constellation symbol and is defined as the intersection point of the parabolas centered at A and B, which can be calculated in closed form.

Figure 21:
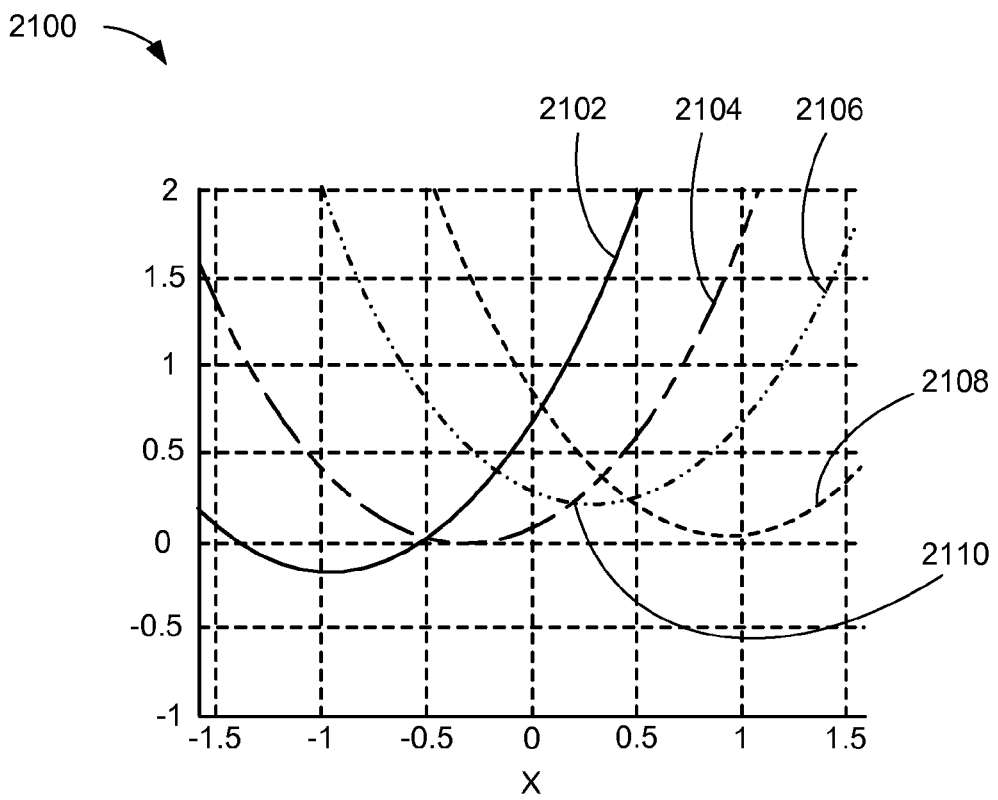
FIG. 21 is a fourth plot for a 16QAM cost function for use in an embodiment of the present invention.

Referring now to FIG. 21, therein is shown a fourth plot for 16QAM cost function block 2100 for use in an embodiment of the present invention. The 16QAM cost function 2100 can represent the first 16QAM constellation 1400 of FIG. 14, the second 16QAM constellation 1500 of FIG. 15, the third 16QAM constellation 1600 of FIG. 16, and the fourth 16QAM constellation 1700 of FIG. 17. The fourth cost function plot is shown having an 11 cost function 2102 centered at 11, a 10 cost function 2104 centered at 10, a 00 cost function 2106 centered at 00, a 01 cost function 2108 centered at 01.

A fourth $T_{A,B}$ 2110 centered at the intersection of the 10 cost function 2104 and the 00 cost function 2106 is shown and has a value of $T_{11,01}$. The fourth $T_{A,B}$ 2110 is a fourth optimal threshold for the first bit in a 16QAM constellation symbol and is defined as the intersection point of the parabolas centered at A and B, which can be calculated in closed form.

The first bit can have values that the center two modulations cannot give the correct decision boundary. Ignoring this inconvenience and utilizing the center two modulations to determine the decision boundary for the first bit unexpectedly results in a mere 0.1 dB loss at 1% FER in the simulated case. The threshold for the first bit in a 16QAM symbol can be represented as Equation 63:

$$\operatorname{Re}(h_1^H(y - h_2 x_2)) \gtreqless -\frac{\sqrt{10} L_1 \sigma^2}{4} \quad \text{(Equation-63)}$$

where $L_1$ denotes the a priori LLR for the first bit of $x_1$ in the real dimension.

The correct rules to determine the application of the fourth $T_{A,B}$ 2110, the third $T_{A,B}$ 2010 of FIG. 20, the second $T_{A,B}$ 1910 of FIG. 19, or the first $T_{A,B}$ 1810 of FIG. 18, can be shown in Table 1 as:

TABLE 1

| Condition 1 | Condition 2 | Condition 3 | Threshold |
|---|---|---|---|
| $T_{11,10} \geq T_{10,00}$ | $T_{10,00} \geq T_{00,01}$ | — | $T_{11,01}$ |
|  | $T_{10,00} < T_{00,01}$ | $T_{11,00} \geq T_{00,01}$ | $T_{11,01}$ |
|  |  | $T_{11,00} < T_{00,01}$ | $T_{11,00}$ |
| $T_{11,10} < T_{10,00}$ | $T_{10,00} \geq T_{00,01}$ | $T_{11,10} \geq T_{10,01}$ | $T_{11,01}$ |
|  |  | $T_{11,10} < T_{10,01}$ | $T_{10,01}$ |
|  | $T_{10,00} < T_{00,01}$ | — | $T_{10,00}$ |

Utilizing the Table 1 requires calculating 4 thresholds and 2-3 comparison stages. Calculating the optimal slicing boundary point for the first bit only is more complex than evaluating all 4 candidates. Table 1 can be used to design a suboptimal slicer.

Under typical conditions, the most likely case is the bottom row of Table 1. The threshold for the first bit of 16QAM can be simplified as the fourth $T_{A,B}$ 2110 centered at the intersection of the 10 cost function 2104 and the 00 cost function 2106 having a value of $T_{10,00}$. This only results in a small performance loss of 0.1 dB for 1% FER and results in the same threshold $\gamma_1$ of (Equation-48) and slicing (Equation-49).

To determine the second bit, a property from the structure of the Gray coded modulation can be leveraged. This property of the Gray code is that except for the first two bits, bit mapping is symmetric about zero. That is, $X_{2,i}^{-1}(x)=X_{2,i}^{-1}(-x)$ for i>2.

This property implies that when deciding on the second and third bits, only the magnitude and not the sign need to be determined or examined. For 16QAM, the threshold of the third bit can be represented as Equation 64:

$$\left|\text{Re}\left(\frac{h_1^H(y-h_2x_2)}{\|h_1\|^2}\right)\right| \gtreqless \frac{2\|h_1\|^2}{\sqrt{10}} + \frac{\sqrt{10}L_2\sigma^2}{4}, \quad \text{(Equation-64)}$$

where $L_2$ denotes the a priori LLR for the third bit. This property of the Gray code holds for all Gray-coded QAM constellations and not just 16QAM. Using this property, the threshold and the optimal decision rule for the third bit is represented as Equations 65 and 66:

$$\gamma_{16QAM,2} \triangleq 2a + \frac{\sigma^2 L_a(1,3)}{4a\|h_1\|^2}, \quad \text{(Equation-65)}$$

$$Q_2^R(x) = \begin{cases} 0 & \text{if } b(Q_1^R(x))R(x) < \gamma_{16QAM,2} \\ 1 & \text{if } b(Q_1^R(x))R(x) > \gamma_{16QAM,2}. \end{cases} \quad \text{(Equation-66)}$$

This slicing decision rule requires determining the first bit prior to determining the second bit. It can become the bottleneck in actual implementation. To overcome this problem, the same assumption can be made as the slicer design for the first bit where the bottom row of Table 1 is in effect, represented by Equation 67:

$$Q_i^{\Re}(x) = Q_i^{\Re}(-x) \text{ for } i>1. \quad \text{(Equation-67)}$$

Using (Equation-67), $b(Q_1^R(x))R(x)$ in (Equation-66) is replaced by $|R(x)|$ and the thresholds for the first and second bits can be determined in parallel.

Figure 22:
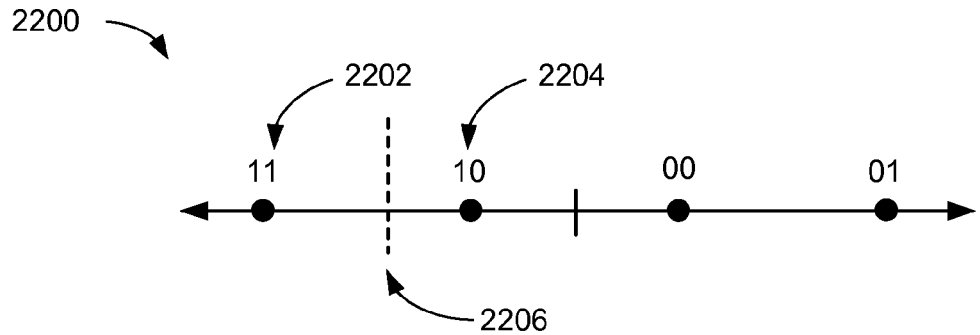
FIG. 22 is a partitioning plot for a pulse-amplitude modulation 4 (4PAM) for use in an embodiment of the present invention.

Referring now to FIG. 22, therein is shown a partitioning plot for a 4PAM 2200 for use in an embodiment of the present invention. The 4PAM 2200 can be real bits of the first 16QAM constellation 1400 of FIG. 14, the second 16QAM constellation 1500 of FIG. 15, the third 16QAM constellation 1600 of FIG. 16, and the fourth 16QAM constellation 1700 of FIG. 17. The real and imaginary dimensions can be separated showing only the 4PAM 2200 symbol as the real dimension of a 16QAM symbol.

A first bit 2202 and a third bit 2204 of the real dimension are shown along the partitioning plot represented by Equation 68:

$$R\left(\frac{h_1^H(y-h_2x_2)}{\|h_1\|^2}\right). \quad \text{(Equation-68)}$$

The bit value 11 can have a modulation of −3a, the bit value 10 can have a modulation value of −a, the bit value 00 can have a modulation value of +a, and the bit value 01 can have a modulation value of +3a.

For the first bit 2202 an a priori shifted threshold 2206 can depend on prior information of both bits but can be approximated by ignoring modulations centered at 11 and 01 and only consider BPSK constellation modulations centered at 10 and 00. This results in the a priori shifted threshold 2206 and slicing function represented by Equation 69:

$$Q_1^R(x) = \begin{cases} 0 & \text{if } R(x) > \gamma_1 \\ 1 & \text{if } R(x) < \gamma_1 \end{cases}, \gamma_1 = -\frac{\sigma^2 L_a(b_k)}{4\alpha\|h_1\|^2}. \quad \text{(Equation-69)}$$

For the third bit 2204, the quantity represented by Equation 70:

$$\left|R\left(\frac{h_1^H(y-h_2x_2)}{\|h_1\|^2}\right)\right|, \quad \text{(Equation-70)}$$

can be sliced to reduce the 4PAM system to a BPSK system. The same technique can be used to determine the optimal decision rule and results in the a priori shifted threshold 2206 and slicing function represented by Equation 71:

$$Q_2^R(x) = \begin{cases} 0 & \text{if } |R(x)| < \gamma_2 \\ 1 & \text{if } |R(x)| > \gamma_2 \end{cases}, \gamma_2 = 2a + \frac{\sigma^2 L_a(b_k)}{4a\|h_1\|^2}, \quad \text{(Equation-71)}$$

or Equation 72:

$$|\text{Re}(h_1^H(y-h_2x_2))| \gtreqless \frac{2\|h_1\|^2}{\sqrt{10}} + \frac{\sqrt{10}L_2\sigma^2}{4}, \quad \text{(Equation-72)}$$

where $L_2$ denotes the a priori LLR for the third bit.

Figure 23:
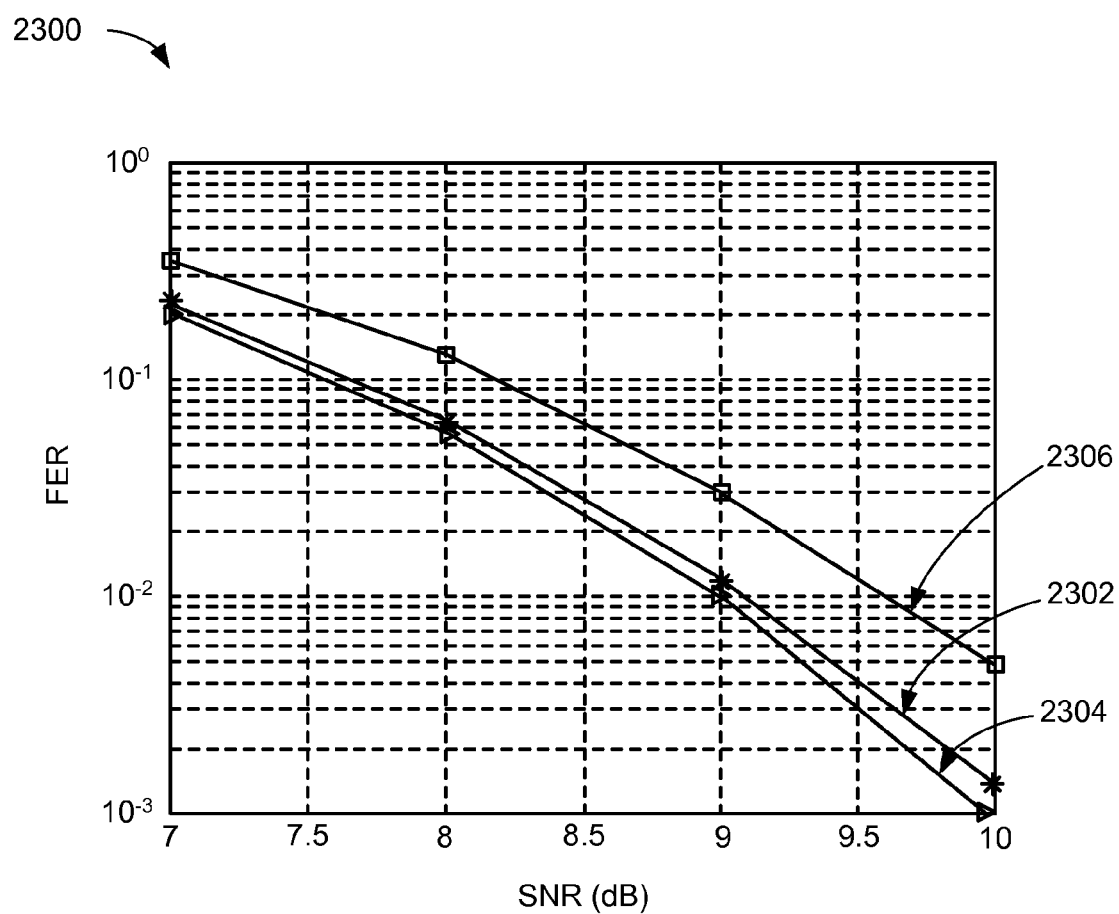
FIG. 23 is a FER of a 16QAM performance plot for an embodiment of the present invention.

Referring now to FIG. 23, therein is shown a FER of a 16QAM performance plot 2300 for an embodiment of the present invention. The FER performance plot can be the FER performance of the receiver block 104 for receiving the multiple transmissions 110 of FIG. 1. The 16QAM performance plot 2300 is shown with the slicing technique under realistic channel conditions for an LTE system. A simple iteration plot 2302 showing the slicing technique of 2 simple iterations is shown against an optimal iteration plot 2304 showing the optimal selection of the hard detection, and against a single-pass plot 2306 showing the ML detection without prior information. Only two global iterations are simulated.

The important parameters of the simulation included: Band width of 10 MHz, FFT size of 1024, Subcarriers 600, MIMO of 2×2, modulation QPSK, Channel Model of extended vehicular A, and Doppler frequency of 70 Hz. The simple iteration plot 2302 is shown slightly higher than the optimal iteration plot 2304 indicating only a slight signal degradation between the optimal and simplified slicing methods of 0.1 dB for 1% FER.

It has been discovered that slicing with the slicing module 602 of FIG. 6 utilizing the a priori shifted threshold 2206 of FIG. 22, results in optimal slicing for the last two bits of a 16QAM symbol and slightly suboptimal performance when slicing the first two bits, all the while significantly decreasing complexity for slicing the 16QAM constellations. It has further been discovered that using the slicing module 602 of FIG. 6 with a single pass implementing the a priori shifted threshold 2206 of FIG. 22 only results in a small increase in FER from the optimal as shown. The single-pass plot 2306 is a lot higher than the optimal iteration plot 2304.

Figure 24:
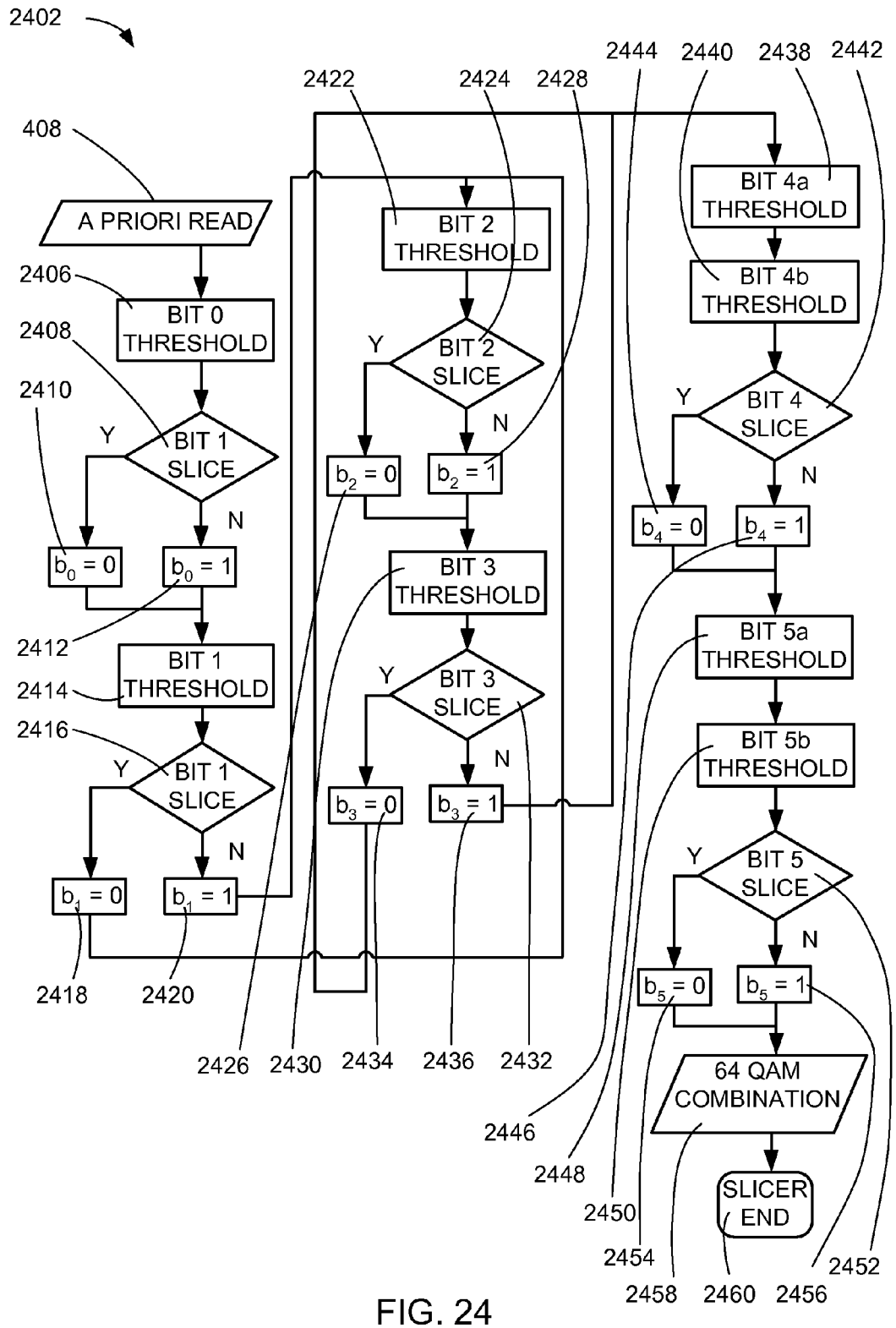
FIG. 24 is a flow chart of a quadrature amplitude modulation 64 (64QAM) slicing module for use in an embodiment of the present invention.

Referring now to FIG. 24, therein is shown a flow chart of a 64QAM slicing module 2402 for use in an embodiment of the present invention. The 64QAM slicing module 2402 can be implemented by the receiver system 201 of FIG. 2. More specifically, the 64QAM slicing module 2402 can be implemented by the detector block 202 of FIG. 2 or the detector block 302 of FIG. 3. The 64QAM slicing module 2402 can operate on, include, or be implemented as a physical hardware device.

The 64QAM slicing module 2402 can include the a priori read block 408 coupled to the 64QAM inter-modulation block 640 of FIG. 6. The a priori read block 408 can read the a priori information of a first signal $x_1$ from the a priori read block 408 as $K(x_1)$ and a.

A bit0 threshold block 2406 can be coupled to the a priori read block 408. The bit0 threshold block 2406 of the 64QAM slicing track 612 of FIG. 6 can incorporate the $L_a(1,1)$ of the a priori read block 408. The bit0 threshold can be represented as Equation 73:

$$\gamma_0 = -\frac{\sigma^2 La(1,1)}{4a\|h_1\|^2}, \qquad \text{(Equation-73)}$$

where $\gamma_0$ is the decision threshold for bit0.

A bit0 slice block 2408 can be coupled to the bit0 threshold block 2406. The bit0 of a 64QAM modulation corresponds to the real axis of a Gray coded constellation. Since Gray coding uses the odd bits (bit0, bit2, and 4) for the real axis of the 64QAM, the odd bits can be considered an 8PAM. The real axis is defined as the x axis of a constellation while the imaginary axis is defined as the y axis of a constellation. The first bit of the 64QAM modulation can be determined as 0 by measuring against the threshold, represented by Equation 74:

$$Re(K(x_1)) > \gamma_0. \qquad \text{(Equation-74)}$$

If the condition is not satisfied, then the first bit of the 64QAM modulation can be determined as 1. Coupled to the bit0 slice block 2408 is a bit0=0 block 2410 and a bit0=1 block 2412.

A bit1 threshold block 2414 can be coupled to the bit0=0 block 2410 and the bit0=1 block 2412. The bit1 threshold block 2414 can incorporate the $L_a(1,2)$ of the a priori read block 408. The bit1 threshold can be represented as Equation 75:

$$\gamma_1 = -\frac{\sigma^2 La(1,2)}{4a\|h_1\|^2}, \qquad \text{(Equation-75)}$$

where $\gamma_1$ is the decision threshold for bit1.

A bit1 slice block 2416 can be coupled to the bit1 threshold block 2414. The bit1 of a 64QAM modulation corresponds to the sign value on an imaginary axis of a Gray coded constellation. Since Gray coding uses the even bits (bit1, bit3, and bit5) for the imaginary axis of the 64QAM, the even bits can be considered an 8PAM. The second bit of the 64QAM modulation can be determined as 0 by measuring against the threshold, represented by Equation 76:

$$Im(\tilde{x}_1) > \gamma_1. \qquad \text{(Equation-76)}$$

If the condition is not satisfied, then the second bit of the 64QAM modulation can be determined as 1. Coupled to the bit1 slice block 2416 is a bit1=0 block 2418 and a bit1=1 block 2420.

A bit2 threshold block 2422 can be coupled to the bit1=0 block 2418 and the bit1=1 block 2420. The bit2 threshold block 2422 of the 64QAM slicing track 612 of FIG. 6 can incorporate the $L_a(2)$ of the estimation module 402 of FIG. 4. The bit2 threshold can be represented as Equation 77:

$$\gamma_2 = 4a + \frac{\sigma^2 La(2)}{4a\|h_1\|^2}, \qquad \text{(Equation-77)}$$

where $\gamma_2$ is the decision threshold for bit2.

A bit2 slice block 2424 can be coupled to the bit2 threshold block 2422. The bit2 of a 64QAM modulation corresponds to a magnitude value on a real axis of a Gray coded constellation irrespective of the sign value since the Gray coded constellation is symmetric about the center for bit2, bit3, bit4, and bit5 for 64QAM. The third bit of the 64QAM modulation can be determined as 0 by measuring against the threshold, represented by Equation 78:

$$|Re(K(x_1))| < \gamma_2. \qquad \text{(Equation-78)}$$

If the condition is not satisfied, then the third bit of the 64QAM modulation can be determined as 1. Coupled to the bit2 slice block 2424 is a bit2=0 block 2426 and a bit2=1 block 2428.

A bit3 threshold block 2430 can be coupled to the bit2=0 block 2426 and the bit2=1 block 2428. The bit3 threshold block 2430 can incorporate the $L_a(3)$ of the estimation module 402 of FIG. 4. The bit3 threshold can be represented as Equation 79:

$$\gamma_3 = 4a + \frac{\sigma^2 La(3)}{4a\|h_1\|^2}, \qquad \text{(Equation-79)}$$

where $\gamma_3$ is the decision threshold for bit3.

A bit3 slice block 2432 can be coupled to the bit3 threshold block 2430. The bit3 of a 64QAM modulation corresponds to a magnitude value on an imaginary axis of a Gray coded constellation. The fourth bit of the 64QAM modulation can be determined as 0 by measuring against the threshold, represented by Equation 80:

$$|Im(K(x_1))| < \gamma_3. \qquad \text{(Equation-80)}$$

If the condition is not satisfied, then the fourth bit of the 64QAM modulation can be determined as 1. Coupled to the bit3 slice block 2432 is a bit3=0 block 2434 and a bit3=1 block 2436.

A bit4a threshold block 2438 can be coupled to the bit3=0 block 2434 and the bit3=1 block 2436. The bit4a threshold block 2438 of the 64QAM slicing track 612 of FIG. 6 can incorporate the $L_a(4)$ of the estimation module 402 of FIG. 4. The bit4a threshold can be represented as Equation 81:

$$\gamma_{4a} = 2a - \frac{\sigma^2 La(4)}{4a\|h_1\|^2}, \qquad \text{(Equation-81)}$$

where $\gamma_{4a}$ is one decision threshold for bit4.

A bit4b threshold block 2440 can be coupled to bit4a threshold block 2438. The bit4b threshold block 2440 of the 64QAM slicing track 612 of FIG. 6 can incorporate the $L_a(4)$ of the estimation module 402 of FIG. 4. The bit4b threshold can be represented as Equation 82:

$$\gamma_{4b} = 6a + \frac{\sigma^2 La(4)}{4a\|h_1\|^2}, \qquad \text{(Equation-82)}$$

where $\gamma_{4b}$ is another decision threshold for bit4.

A bit4 slice block 2442 can be coupled to the bit4b threshold block 2440. The bit4 of a 64QAM modulation corresponds to a magnitude value on a real axis of a Gray coded constellation irrespective of the sign value since the Gray coded constellation is symmetric about the center for bit2, bit3, bit4, and bit5 for 64QAM. The fifth bit of the 64QAM modulation can be determined as 0 by measuring against the threshold 4a and 4b, represented by Equation 83:

$$\gamma_{4a} < |Re(K(x_1))| < \gamma_{4b}. \quad \text{(Equation-83)}$$

If the condition is not satisfied, then the fifth bit of the 64QAM modulation can be determined as 1. Coupled to the bit4 slice block 2442 is a bit4=0 block 2444 and a bit2=1 block 2446.

A bit5a threshold block 2448 can be coupled to the bit4=0 block 2444 and the bit4=1 block 2446. The bit5a threshold block 2448 of the 64QAM slicing track 612 of FIG. 6 can incorporate the $L_a(5)$ of the estimation module 402 of FIG. 4. The bit5a threshold can be represented as Equation 84:

$$\gamma_{5a} = 2a - \frac{\sigma^2 La(5)}{4a\|h_1\|^2}, \quad \text{(Equation-84)}$$

where $\gamma_{5a}$ is one decision threshold for bit5.

A bit5b threshold block 2450 can be coupled to bit5a threshold block 2448. The bit5b threshold block 2450 of the 64QAM slicing track 612 of FIG. 6 can incorporate the $L_a(5)$ of the estimation module 402 of FIG. 4. The bit4b threshold can be represented as Equation 85:

$$\gamma_{5b} = 6a + \frac{\sigma^2 La(5)}{4a\|h_1\|^2}, \quad \text{(Equation-85)}$$

where $\gamma_{5b}$ is another decision threshold for bit4.

A bit5 slice block 2452 can be coupled to the bit5b threshold block 2450. The bit5 of a 64QAM modulation corresponds to a magnitude value on an imaginary axis of a Gray coded constellation irrespective of the sign value since the Gray coded constellation is symmetric about the center for bit2, bit3, bit4, and bit5 for 64QAM. The sixth bit of the 64QAM modulation can be determined as 0 by measuring against the threshold 5a and 5b, represented by Equation 86:

$$\gamma_{5a} < |Re(K(x_1))| < \gamma_{5b}. \quad \text{(Equation-86)}$$

If the condition is not satisfied, then the sixth bit of the 64QAM modulation can be determined as 1. Coupled to the bit5 slice block 2452 is a bit5=0 block 2454 and a bit5=1 block 2456. A 64QAM combination block 2458 can be coupled to the bit5=0 block 2454 and the bit5=1 block 2456. The 64QAM combination block 2458 can combine the bits 0-5 into a symbol $x_1$. A slicer end block 2460 can be coupled to the 64QAM combination block 2458.

Figure 25:
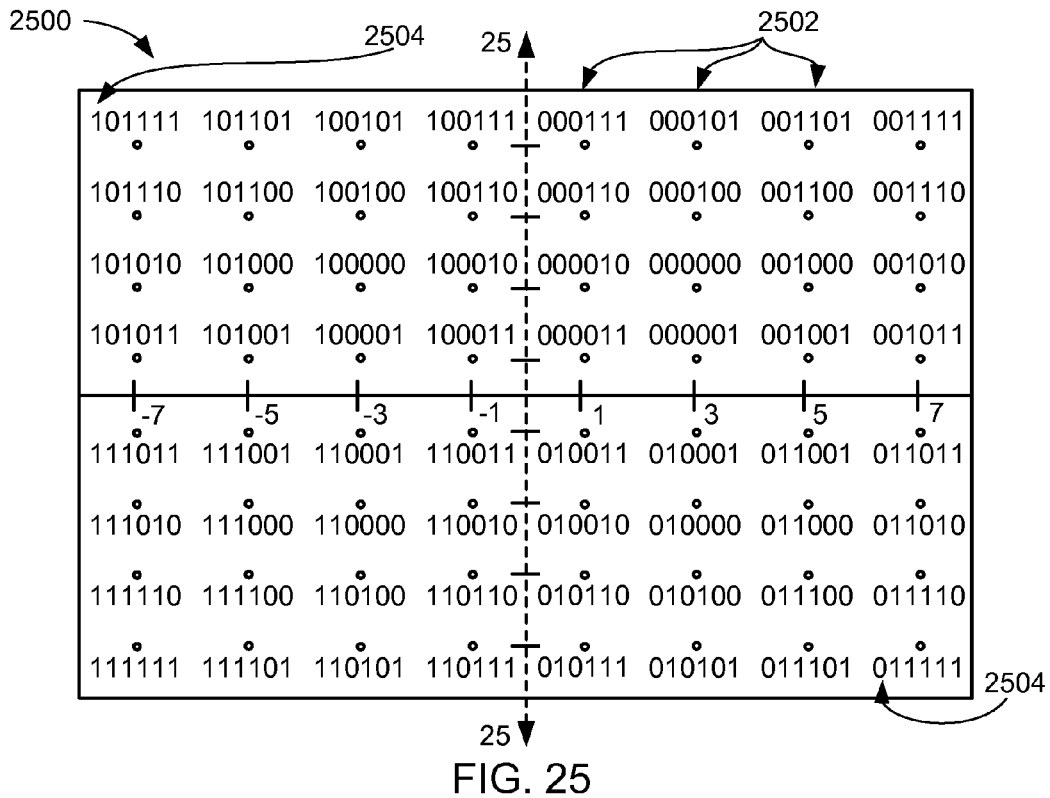
FIG. 25 is a plot of a first 64QAM constellation for use in an embodiment of the present invention.

Referring now to FIG. 25, therein is shown a plot of a first 64QAM constellation 2500 for use in an embodiment of the present invention. The first 64QAM constellation 2500 can form some or all of the multiple transmissions 110 of FIG. 1 and can be an AWGN system y=Ax+n where x belongs to a general 64QAM constellation, A is a complex channel coefficient, and n is white Gaussian noise. The energy of the first 64QAM constellation 2500 can be represented by Equation 87:

$$E(|x|^2) = 1 \quad \text{(Equation-87)}$$

The first 64QAM constellation 2500 can have multiple symbols 2502, each of the multiple symbols 2502 can have a bit0 2504. The first 64QAM constellation 2500 can be normalized, and the multiple symbols 2502 neighboring each other are separated by a distance of 2a.

A first symbol $x_1$ can be partitioned without a priori information by testing y/A against the following thresholds represented by Equation 88:

$$Re\left(\frac{y}{A}\right) \geq 0,\ Im\left(\frac{y}{A}\right) \geq 0. \quad \text{(Equation-88)}$$

By combining the results of these threshold tests, one can easily determine the minimum ED estimate (also the maximum likelihood estimate) of x, $\hat{x} = \mathrm{argmin}_x |y - Ax|^2$ efficiently.

The first 64QAM constellation 2500 can be Gray coded. Gray coding is a symbol-to-bit mapping system that limits the transition between symbols to a single bit transition. Gray coded constellations have a unique bit layout that can be used to simplify the slicing of the 64QAM symbols. The bit in the odd-position (first bit) or the bit0 2504 determines the real part or axis of the modulation and specifically the bit0 2504 determines the sign of the real axis in the 64QAM constellation.

The real axis is defined as the x axis of the first 64QAM constellation 2500. The first 64QAM constellation 2500 is shown having a line 25-25 that divides the positive and the negative portions of the real axis. The bits in the first positions or the bit0 2504 can be shown as having a value of zero to the right of the line 25-25 but a value of 1 to the left of line 25-25. The bit0 2504 can correspond to a sign value in the real axis without regard to magnitude.

Figure 26:
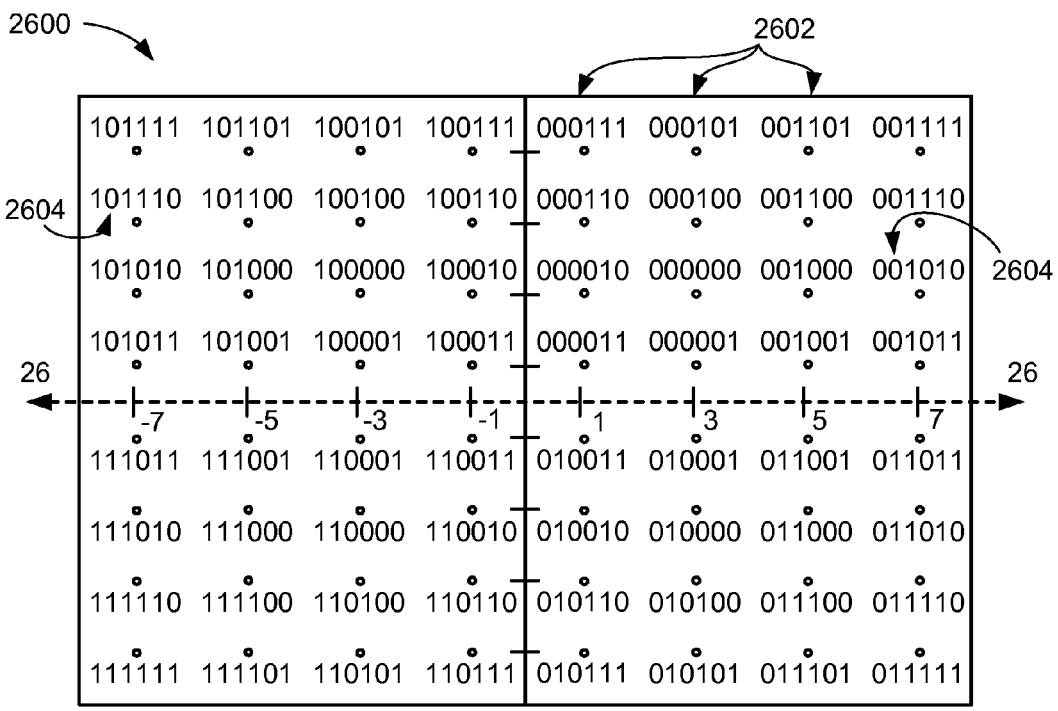
FIG. 26 is a plot of a second 64QAM constellation for use in an embodiment of the present invention.

Referring now to FIG. 26, therein is shown a plot of a second 64QAM constellation 2600 for use in an embodiment of the present invention. The second 64QAM constellation 2600 can form some or all of the multiple transmissions 110 of FIG. 1 and can have multiple symbols 2602, each of the multiple symbols 2602 can have a bit1 2604. The second 64QAM constellation 2600 can be normalized, and the multiple symbols 2602 neighboring each other are separated by a distance of 2a.

A line 26-26 is shown dividing the second 64QAM constellation 2600 along the imaginary axis. The imaginary axis is defined as the sin or y axis corresponding to bits in even positions. The bit1 2604 is the second bit and is in an even position and corresponds to the imaginary plane. The bit1 2604 in the second bit position is shown having a value of 0 above the line 26-26 and a value of 1 below the line 26-26. The transmit symbols can be sliced by sign in the real and imaginary dimension based on the bit0 2504 of FIG. 25 and the bit1 2606, respectively, without regard to magnitude.

Figures 27, 28:
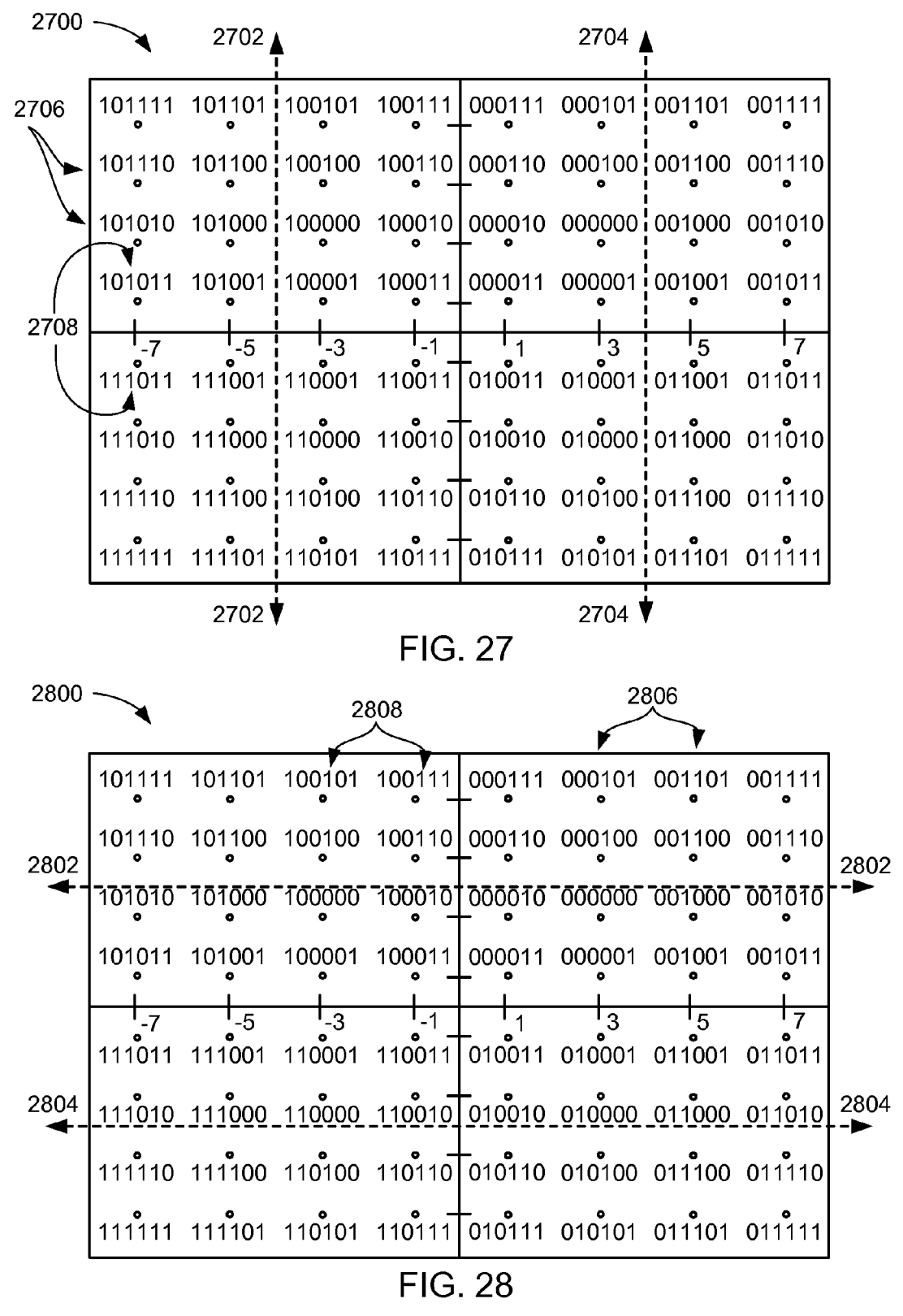

Referring now to FIG. 27, therein is shown a plot of a third 64QAM constellation 2700 for use in an embodiment of the present invention. The third 64QAM constellation 2700 can form some or all of the multiple transmissions 110 of FIG. 1 and can be shown having a threshold at ±4a along a real axis and depicted by a first line 2702-2702 at a position of −4a and a second line 2704-2704 at a position of +4a.

The third 64QAM constellation 2700 is shown having multiple symbols 2706. The multiple symbols 2706 are shown having a bit2 2708 in the third bit position. The third 64QAM constellation 2700 can utilize the Gray coding. Gray coding allows the bit2 2708 to be symmetrical about the center of the real axis. The bit2 2708 can be determined without respect to the sign value of the bit2 2708 modulation value.

This can be illustrated for example by the bit2 2708 having a bit value of 0 when the bit2 2708 is located between the first line 2702-2702 and the second line 2704-2704. This can be further illustrated for example by the bit2 2708 having a bit value of 1 when the bit2 2708 is located to the left of the first line 2702-2702 or to the right of the second line 2704-2704.

Referring now to FIG. 28, therein is shown a plot of a fourth 64QAM constellation 2800 for use in an embodiment of the present invention. The fourth 64QAM constellation 2800 can form some or all of the multiple transmissions 110 of FIG. 1 and can be shown having a threshold at ±4a along an imaginary axis and depicted by a first line 2802-2802 at a position of +4a and a second line 2804-2804 at a position of −4a.

The fourth 64QAM constellation 2800 is shown having multiple symbols 2806. The multiple symbols 2806 are shown having a bit3 2808 in the fourth bit position. The fourth 64QAM constellation 2800 can utilize the Gray coding. Gray coding allows the bit3 2808 to be symmetrical about the center of the imaginary axis. The bit3 2808 can be determined without respect to the sign value of the bit3 2808 modulation value.

This can be illustrated for example by the bit3 2808 having a bit value of 0 when the bit3 2808 is located between the first line 2802-2802 and the second line 2804-2804. This can be further illustrated for example by the bit3 2808 having a bit value of 1 when the bit3 2808 is located below the first line 2802-2802 and above the second line 2804-2804.

Figure 29:
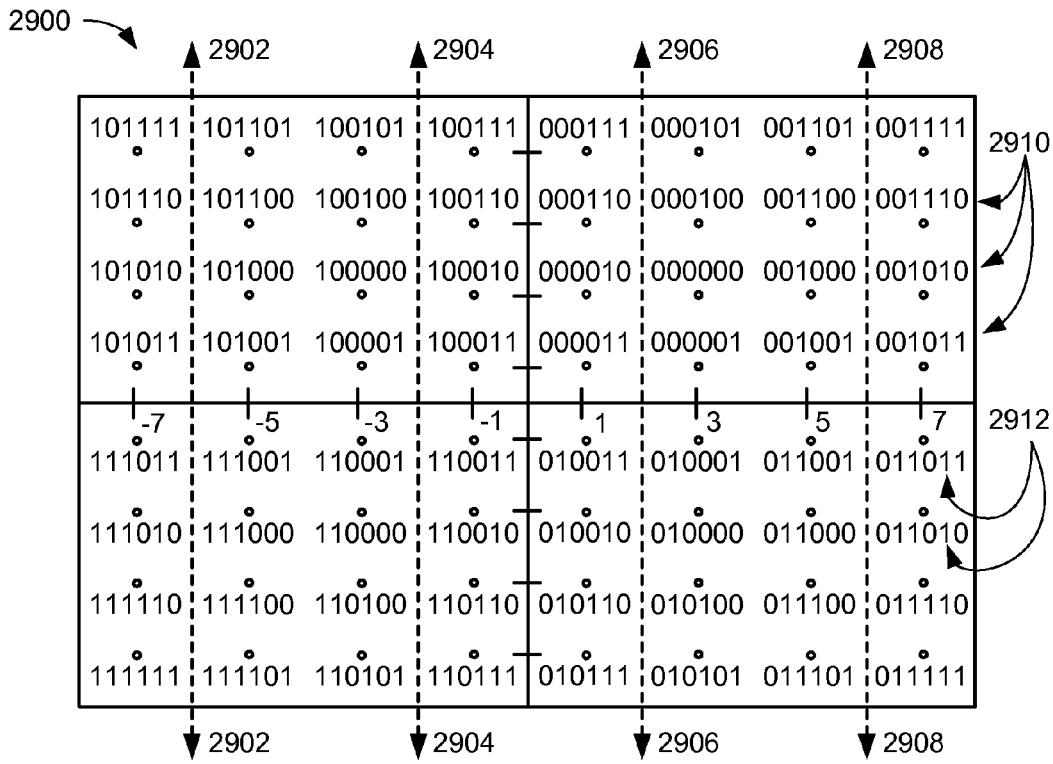
FIG. 29 is a plot of a fifth 64QAM constellation for use in an embodiment of the present invention.

Referring now to FIG. 29, therein is shown a plot of a fifth 64QAM constellation 2900 for use in an embodiment of the present invention. The third 64QAM constellation 2900 can form some or all of the multiple transmissions 110 of FIG. 1 and can be shown having a threshold at ±6a and ±2a along a real axis and depicted by a first line 2902-2902 at a position of −6a, a second line 2904-2904 at a position of −2a, a third line 2906-2906 at a position of +2a, and a fourth line 2908 at a position of +6a.

The third 64QAM constellation 2900 is shown having multiple symbols 2910. The multiple symbols 2906 are shown having a bit4 2912 in the fifth bit position. The third 64QAM constellation 2900 can utilize the Gray coding. Gray coding allows the bit4 2912 to be symmetrical about the center of the real axis. The bit4 2908 can be determined without respect to the sign value of the bit4 2912 modulation value.

This can be illustrated for example by the bit4 2912 having a bit value of 0 when the bit4 2912 is located between the first line 2902-2902 and the second line 2904-2904, or located between the third line 2906-2906 and the fourth line 2908-2908. This can be further illustrated for example by the bit4 2912 having a bit value of 1 when the bit4 2912 is located to the left of the first line 2902-2902, or to the right of the fourth line 2908-2908, or between the second line 2904-2904 and the third line 2906-2906.

Figure 30:
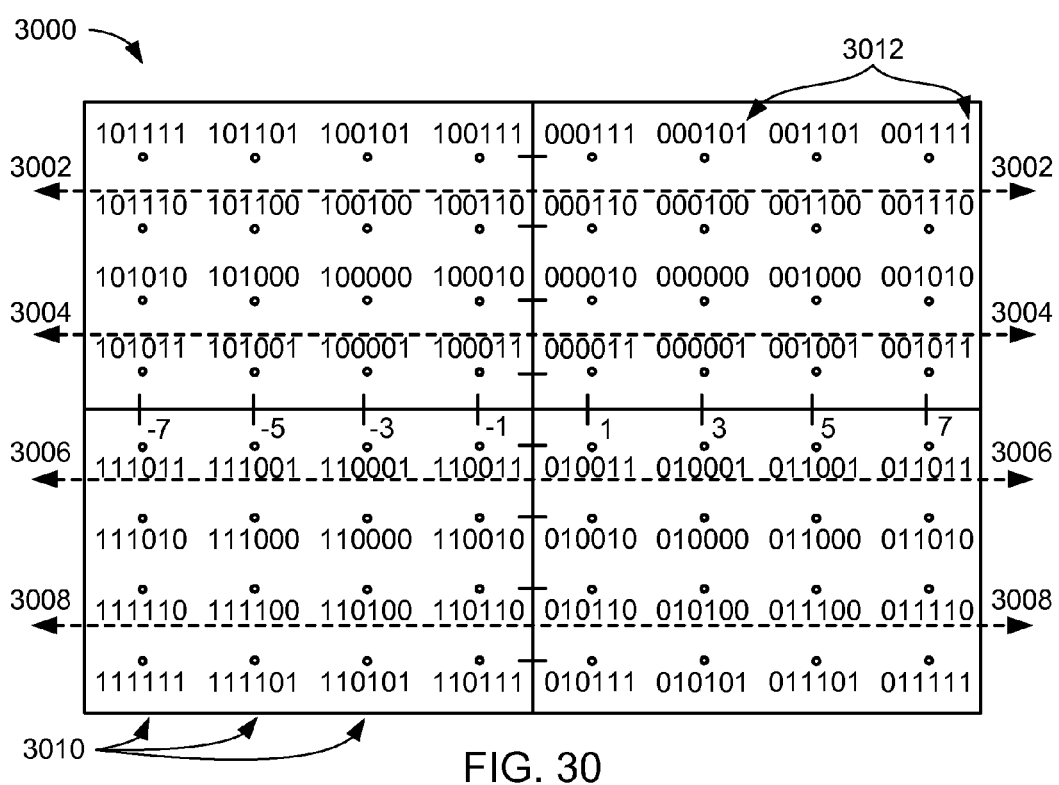
FIG. 30 is a plot of a sixth 64QAM constellation for use in an embodiment of the present invention.

Referring now to FIG. 30, therein is shown a plot of a sixth 64QAM constellation 3000 for use in an embodiment of the present invention. The third 64QAM constellation 3000 can form some or all of the multiple transmissions 110 of FIG. 1 and can be shown having a threshold at ±6a and ±2a along an imaginary axis and depicted by a first line 3002-3002 at a position of +6a, a second line 3004-3004 at a position of +2a, a third line 3006-3006 at a position of −2a, and a fourth line 3008 at a position of −6a.

The third 64QAM constellation 3000 is shown having multiple symbols 3010. The multiple symbols 3006 are shown having a bit5 3012 in the sixth and last bit position. The third 64QAM constellation 3000 can utilize the Gray coding. Gray coding allows the bit5 3012 to be symmetrical about the center of the imaginary axis. The bit5 3008 can be determined without respect to the sign value of the bit5 3012 modulation value.

This can be illustrated for example by the bit5 3012 having a bit value of 0 when the bit5 3012 is located between the first line 3002-3002 and the second line 3004-3004, or located between the third line 3006-3006 and the fourth line 3008-3008. This can be further illustrated for example by the bit5 3012 having a bit value of 1 when the bit5 3012 is located above the first line 3002-3002, below the fourth line 3008-3008, or between the second line 3004-3004 and the third line 3006-3006.

Figure 31:
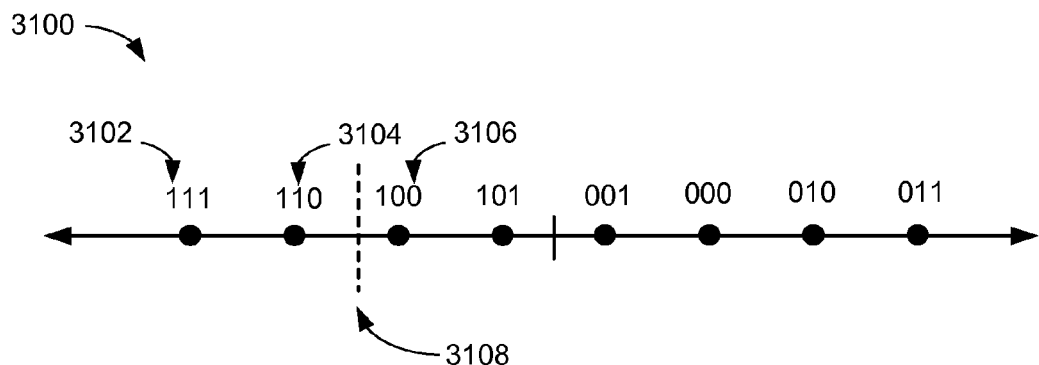
FIG. 31 is a partitioning plot for a pulse-amplitude modulation 8 (8PAM) for use in an embodiment of the present invention.

Referring now to FIG. 31, therein is shown a partitioning plot for an 8PAM 3100 for use in an embodiment of the present invention. The 8PAM 3100 can be real bits of the first 64QAM constellation 2500 of FIG. 25, the second 64QAM constellation 2600 of FIG. 26, the third 64QAM constellation 2700 of FIG. 27, the fourth 64QAM constellation 2800 of FIG. 28, the fifth 64QAM constellation 2900 of FIG. 29, and the sixth 64QAM constellation 3000 of FIG. 30. The partitioning plot only considers the 64QAM constellation since the real and imaginary dimensions can be separated, the 8PAM 3100 symbol is the real dimension of a 64QAM symbol.

A first bit 3102, a third bit 3104, and a fifth bit 3106, determining the real dimension, are shown along the partitioning plot represented by Equation 89:

$$R\left(\frac{h_1^H(y - h_2 x_2)}{\|h_1\|^2}\right). \quad \text{(Equation-89)}$$

For the first bit 3102 an a priori shifted threshold 3108 can depend on prior information of all 3 real bits but can be approximated by only considering constellation modulations centered at 10 and 00. This results in a suboptimal decision threshold and slicing function represented by Equation 90:

$$Q_1^R(x) = \begin{cases} 0 & \text{if } R(x) > \gamma_1 \\ 1 & \text{if } R(x) < \gamma_1 \end{cases}, \gamma_1 = -\frac{\sigma^2 L_a(b_k)}{4a\|h_1\|^2}, \quad \text{(Equation-90)}$$

or Equation 91:

$$\text{Re}(h_1^H(y - h_2 x_2)) \gtreqless -\frac{\sqrt{42} L_1 \sigma^2}{4}, \quad \text{(Equation-91)}$$

or Equations 92 and 93:

$$\gamma_{64QAM,2} \triangleq 4a + \frac{\sigma^2 L_a(1, 3)}{4a\|h_1\|^2}, \quad \text{(Equation-92)}$$

$$Q_1^R(x) = \begin{cases} 0 & \text{if } R(x) > \gamma_1 \\ 1 & \text{if } R(x) < \gamma_1. \end{cases} \quad \text{(Equation-93)}$$

A similar technique can be used to determine the suboptimal decision rule and results in the decision threshold and slicing function of the third bit of the 64QAM real dimension represented by Equation 94:

$$Q_2^R(x) = \begin{cases} 0 & \text{if } |R(x)| < \gamma_2 \\ 1 & \text{if } |R(x)| > \gamma_2 \end{cases}, \gamma_2 = 4a + \frac{\sigma^2 L_a(b_k)}{4a\|h_1\|^2}, \quad \text{(Equation-94)}$$

or Equation 95:

$$|\text{Re}(h_1^H(y - h_2 x_2))| \gtreqless \frac{4\|h_1\|^2}{\sqrt{42}} + \frac{\sqrt{42} L_2 \sigma^2}{4}, \quad \text{(Equation-95)}$$

or Equations 96 and 97:

$$\gamma_{64QAM,2} \triangleq 4a + \frac{\sigma^2 L_a(1,3)}{4a\|h_1\|^2}, \quad \text{(Equation-96)}$$

$$Q_2^R(x) = \begin{cases} 0 & \text{if } |\mathcal{R}(x)| < \gamma_{64QAM,2} \\ 1 & \text{if } |\mathcal{R}(x)| > \gamma_{64QAM,2} \end{cases} \quad \text{(Equation-97)}$$

Lastly, a similar technique can be used to determine the optimal decision rule and results in the decision threshold and slicing function of the third bit of the 64QAM real dimension represented by Equations 98 and 99:

$$Q_3^R(x) = \begin{cases} 0 & \text{if } \gamma_{3a} < |\mathcal{R}(x)| < \gamma_{3b} \\ 1 & \text{else}, \end{cases} \quad \text{(Equation-98)}$$

$$\gamma_{3a} \triangleq 2a - \frac{\sigma^2 L_a(b_k)}{4a\|h_1\|^2}, \gamma_{3b} \triangleq 6a + \frac{\sigma^2 L_a(b_k)}{4a\|h_1\|^2}, \quad \text{(Equation-99)}$$

or Equation 100:

$$\frac{2\|h_1\|^2}{\sqrt{42}} - \frac{\sqrt{42} L_3 \sigma^2}{4} < \quad \text{(Equation-100)}$$

$$|\text{Re}(h_1^H(y - h_2 x_2))| < \frac{6\|h_1\|^2}{\sqrt{42}} + \frac{\sqrt{42} L_3 \sigma^2}{4},$$

or Equations 101 and 102:

$$\gamma_{64QAM,3a} \triangleq 2a - \frac{\sigma^2 L_a(1,5)}{4a\|h_1\|^2}, \quad \text{(Equation-101)}$$

$$\gamma_{64QAM,3b} \triangleq 6a + \frac{\sigma^2 L_a(1,5)}{4a\|h_1\|^2},$$

$$Q_3^R(x) = \begin{cases} 0 & \text{if } \gamma_{64QAM,3a} < |\mathcal{R}(x)| < \gamma_{64QAM,3b}, \\ 1 & \text{else}, \end{cases} \quad \text{(Equation-102)}$$

where $L_1$, $L_2$, and $L_3$ represent the first, second, and third bits that control the real dimension of the $x_1$ modulation all decision rules only rely on prior information of their own bit.

Figure 32:
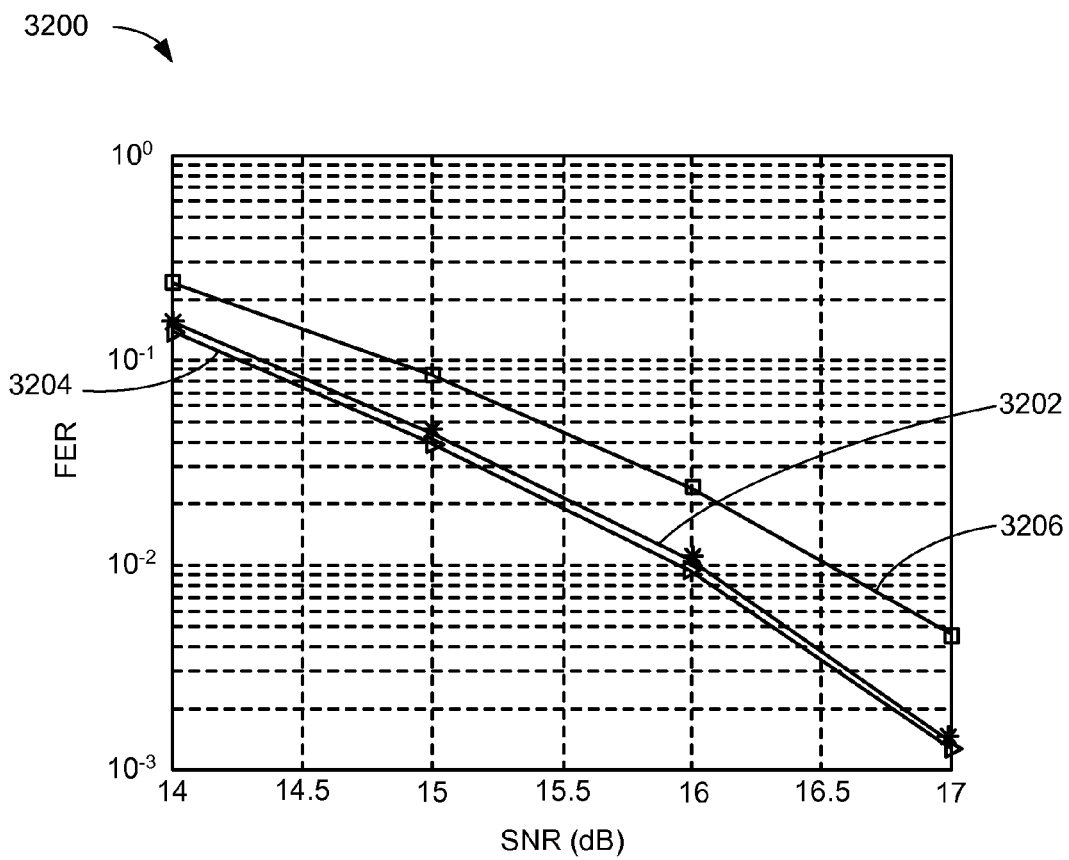
FIG. 32 is a FER of a 64QAM performance plot for an embodiment of the present invention.

Referring now to FIG. 32, therein is shown a FER of a 64QAM performance plot 3200 for an embodiment of the present invention. The FER performance plot can be the FER performance of the receiver block 104 for receiving the multiple transmissions 110 of FIG. 1. The 64QAM performance plot 3200 is shown with the slicing technique under realistic channel conditions for an LTE system. A simple iteration plot 3202 showing the slicing technique of 2 simple iterations is shown against an optimal iteration plot 3204 showing the optimal selection of the hard detection, and against a single-pass plot 3206 showing the ML detection without prior information. Only two global iterations are simulated.

The important parameters of the simulation included: Band width of 10 MHz, FFT size of 1024, Subcarriers 600, MIMO of 2×2, modulation QPSK, Channel Model of extended vehicular A, and Doppler frequency of 70 Hz. The simple iteration plot 3202 is shown slightly higher than the optimal iteration plot 3204 indicating only a slight signal degradation between the optimal and simplified slicing methods of 0.1 dB for 1% FER.

It has been discovered that slicing with the slicing module 602 of FIG. 6 utilizing the a priori shifted threshold 3108 of FIG. 32, results in optimal slicing for the last two bits of a 64QAM symbol and slightly suboptimal performance when slicing the first four bits, all the while significantly decreasing complexity for slicing the 64QAM constellations. It has further been discovered that slicing with the slicing module 602 of FIG. 6 utilizing the a priori shifted threshold 3108 of FIG. 32 only results in a small increase in FER from the optimal while the single-pass plot 3206 has a lot more FER higher than the optimal iteration plot 3204.

Figure 33:
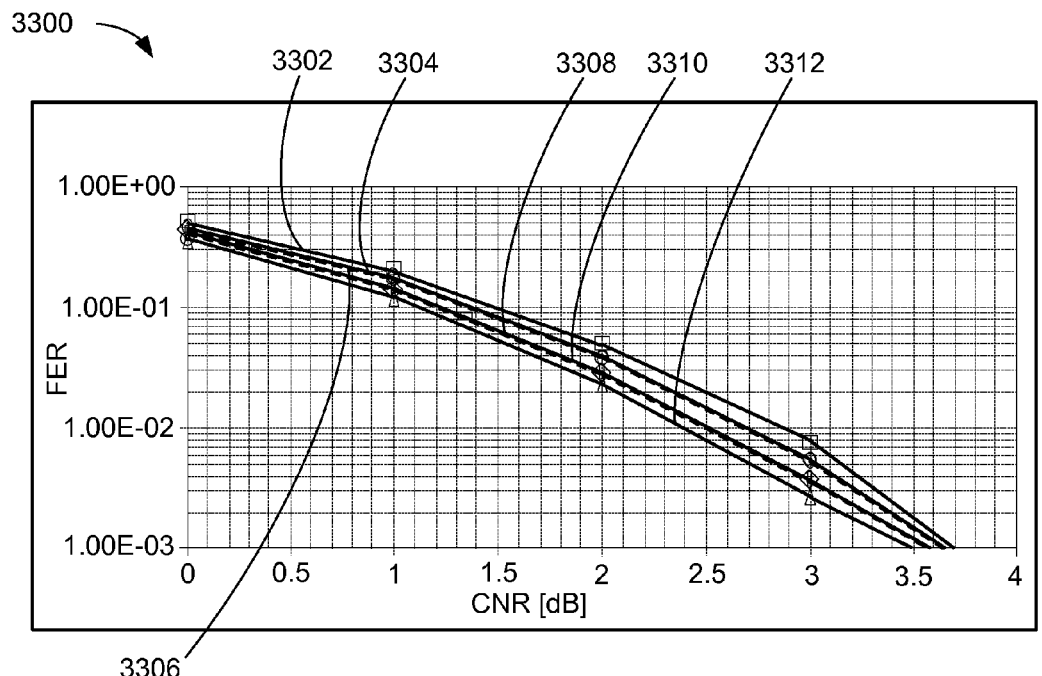
FIG. 33 is a FER performance plot for QPSK constellation at low coding rate of an embodiment of the present invention.

Referring now to FIG. 33, therein is shown a FER performance plot 3300 for QPSK constellation at low coding rate of an embodiment of the present invention. The FER performance plot 3300 can be the FER performance of the receiver block 104 for receiving the multiple transmissions 110 of FIG. 1. Simulation of the results of using this slicer using 2×2 open loop spatial multiplexing under MCS 4 3300. No iterative detection and decoding is performed in the FER performance plot 3300, only the second code word can benefit from the a priori information after decoding the first code word.

Overall the efficient slicer suffers negligible performance loss of less than 0.1 dB from the optimal selection method over all modulation and coding rates. This slicing method puts the MIMO detector complexity when a priori information is available to the same level of complexity when no a priori information is available.

The FER performance plot 3300 is shown having a Maximum Likelihood (ML) 3302 with 1 global iteration and 8 turbo iterations with early stopping ON. The FER and 8 turbo iterations with early stopping ON, overlapping a simple (Simp.) 3306 iteration performance plot is also shown having a Better 3304 plot with 1 global iteration with 1 global iteration and 8 turbo iterations with early stopping ON.

The FER performance plot 3300 is also shown having a certified wave 2 (CW2) 3308 overlapping a Simp. CW2 3310 with 1 global iteration and 8 turbo iterations with early stopping ON. Finally, the FER performance plot 3300 is shown having plot 3312 with 2 global iteration and 8 turbo iterations with early stopping ON.

Figure 34:
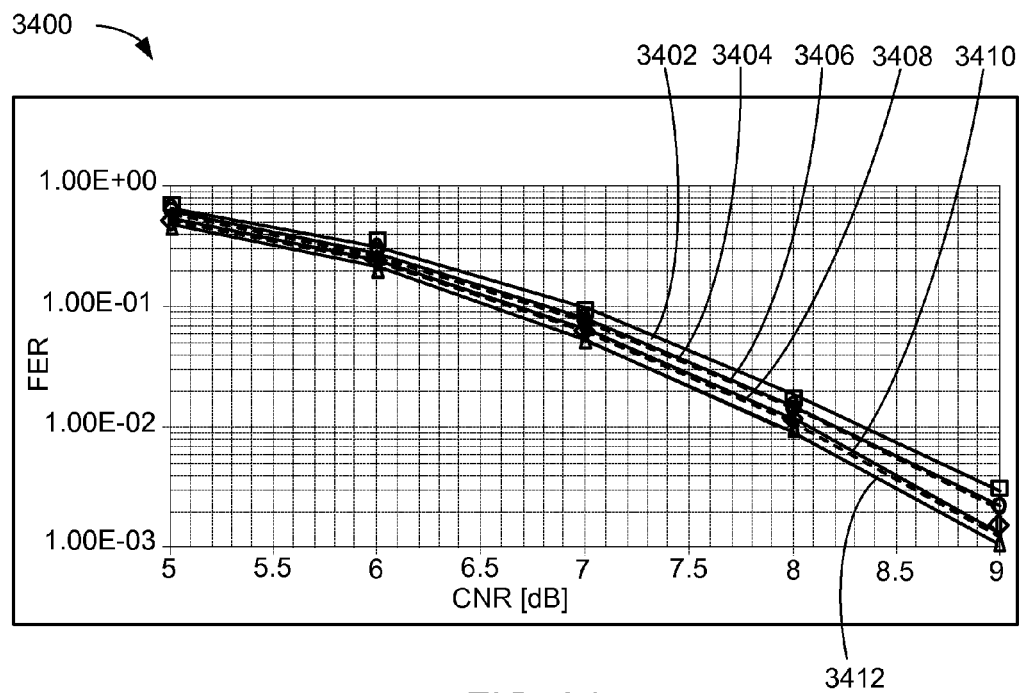
FIG. 34 is a FER performance plot for QPSK constellation at high coding rate of the present invention.

Referring now to FIG. 34, therein is shown a FER performance plot 3400 for QPSK constellation at high coding rate of the present invention. The FER performance plot 3400 can be the FER performance of the receiver block 104 for receiving the multiple transmissions 110 of FIG. 1. Simulation of the results of using this slicer using 2×2 open loop spatial multiplexing. No iterative detection and decoding is performed in the FER performance plot 3400, only the second code word can benefit from the a priori information after decoding the first code word.

The FER performance plot 3400 is shown having a ML 3402 with 1 global iteration and 8 turbo iterations with early stopping ON. The FER performance plot 3400 is also shown having a Better 3404 plot with 1 global iteration and 8 turbo iterations with early stopping ON, slightly over a Simp. 3406 iteration with 1 global iteration and 8 turbo iterations with early stopping ON.

The FER performance plot 3400 is also shown having a CW2 3408 slightly above a Simp. CW2 3410 with 1 global iteration and 8 turbo iterations with early stopping ON. Finally, the FER performance plot 3400 is shown having a plot 3412 with 2 global iteration and 8 turbo iterations with early stopping ON.

Figure 35:
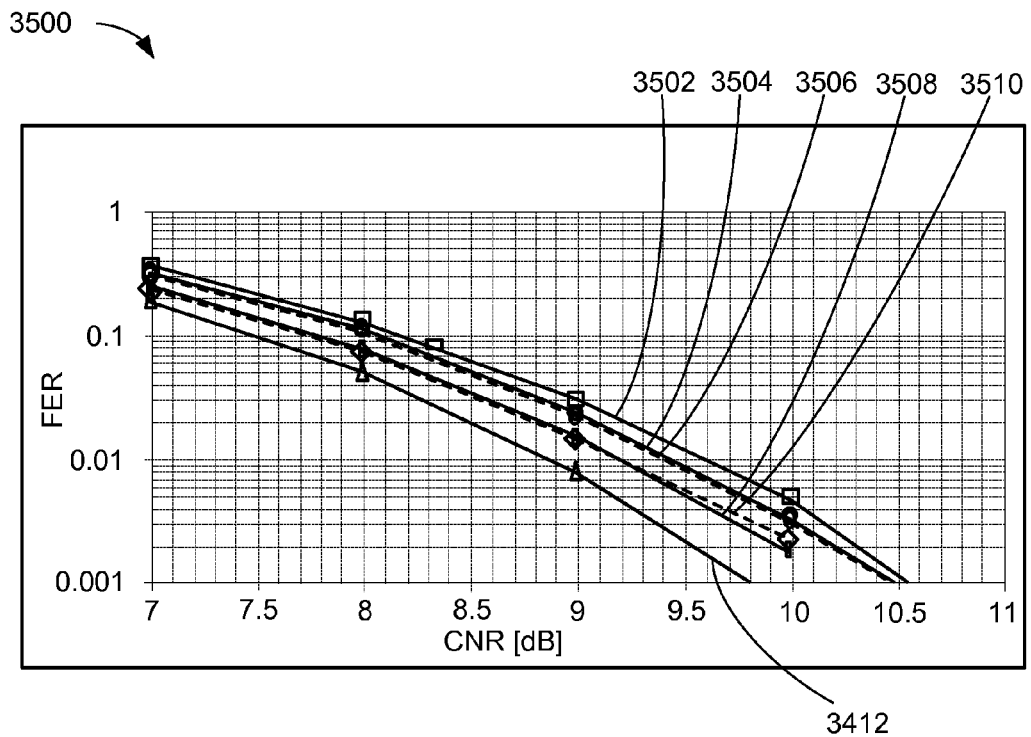
FIG. 35 is a FER performance plot for 16QAM constellation at low coding rate of the present invention.

Referring now to FIG. 35, therein is shown a FER performance plot 3500 for 16QAM constellation at low coding rate of an embodiment of the present invention. The FER performance plot 3500 can be the FER performance of the receiver block 104 for receiving the multiple transmissions 110 of FIG. 1. Simulation of the results of using this slicer using 2×2 open loop spatial multiplexing. No iterative detection and decoding is performed in the FER performance plot 3500, only the second code word can benefit from the a priori information after decoding the first code word.

The FER performance plot 3500 is shown having a ML 3502 with 1 global iteration and 8 turbo iterations with early stopping ON. The FER performance plot 3500 is also shown having a Better 3504 plot with 1 global iteration and 8 turbo iterations with early stopping ON, slightly under a Simp. 3506 iteration with 1 global iteration and 8 turbo iterations with early stopping ON.

The FER performance plot 3500 is also shown having a CW2 3508 slightly under a Simp. CW2 3510 with 1 global iteration and 8 turbo iterations with early stopping ON. Finally, the FER performance plot 3500 is shown having a plot 3512 with 2 global iteration and 8 turbo iterations with early stopping ON.

Figure 36:
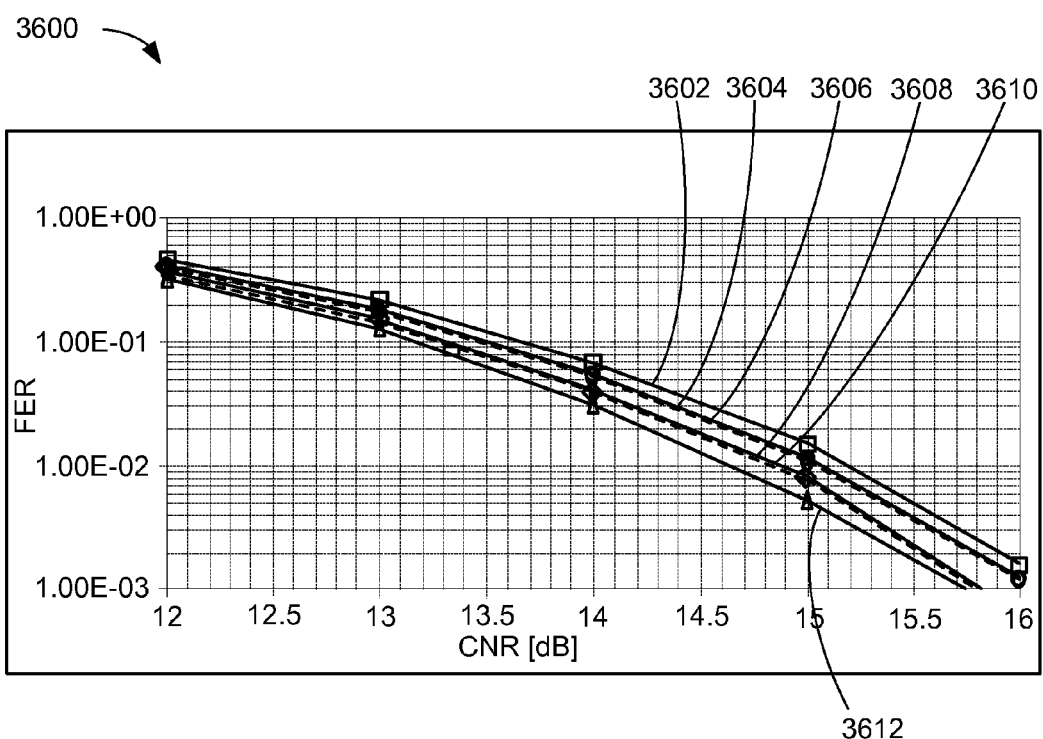
FIG. 36 is a FER performance plot for 16QAM constellation at high coding rate of the present invention.

Referring now to FIG. 36, therein is shown a FER performance plot 3600 for 16QAM constellation at high coding rate of an embodiment of the present invention. The FER performance plot 3600 can be the FER performance of the receiver block 104 for receiving the multiple transmissions 110 of FIG. 1. Simulation of the results of using this slicer using 2×2 open loop spatial multiplexing under. No iterative detection and decoding is performed in the FER performance plot 3600, only the second code word can benefit from the a priori information after decoding the first code word.

The FER performance plot 3600 is shown having a ML 3602 with 1 global iteration and 8 turbo iterations with early stopping ON. The FER performance plot 3600 is also shown having a Better 3604 plot with 1 global iteration and 8 turbo iterations with early stopping ON, overlapping a Simp. 3606 iteration with 1 global iteration and 8 turbo iterations with early stopping ON.

The FER performance plot 3600 is also shown having a CW2 3608 overlapping a Simp. CW2 3610 with 1 global iteration and 8 turbo iterations with early stopping ON. Finally, the FER performance plot 3600 is shown having a plot 3612 with 2 global iteration and 8 turbo iterations with early stopping ON.

Figure 37:
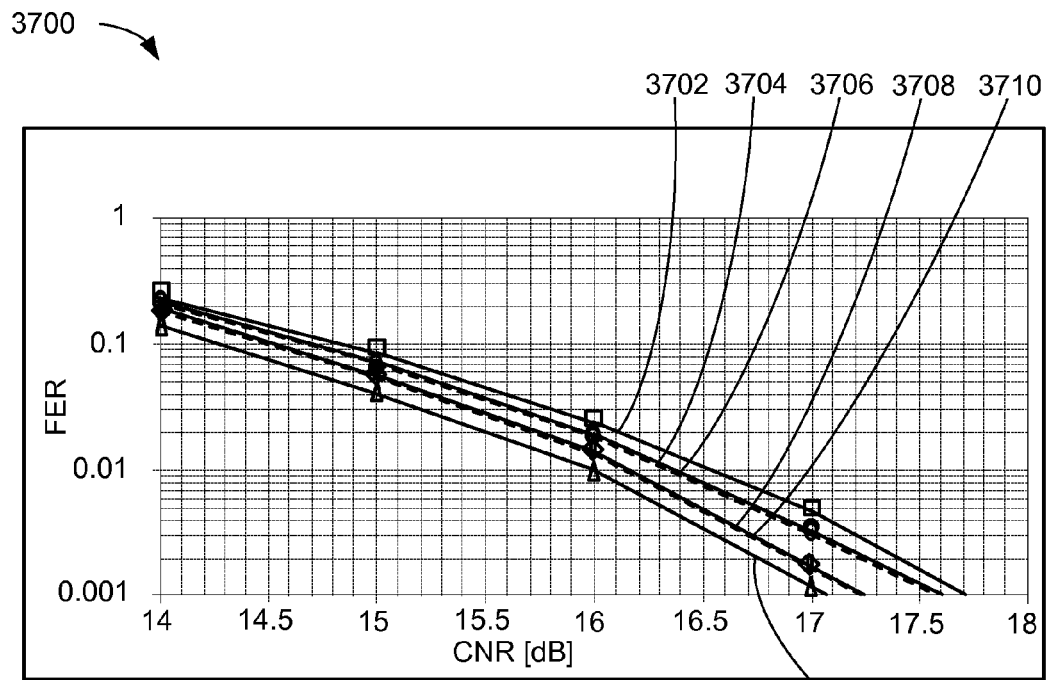
FIG. 37 is a FER performance plot 64QAM constellation at low coding rate of the present invention.

Referring now to FIG. 37, therein is shown a FER performance plot 3700 for 64QAM constellation at low coding rate of an embodiment of the present invention. The FER performance plot 3700 can be the FER performance of the receiver block 104 for receiving the multiple transmissions 110 of FIG. 1. Simulation of the results of using this slicer using 2×2 open loop spatial multiplexing. No iterative detection and decoding is performed in the FER performance plot 3700, only the second code word can benefit from the a priori information after decoding the first code word.

The FER performance plot 3700 is shown having a ML 3702 with 1 global iteration and 8 turbo iterations with early stopping ON. The FER performance plot 3700 is also shown having a Better 3704 plot with 1 global iteration and 8 turbo iterations with early stopping ON, slightly under a Simp. 3706 iteration with 1 global iteration and 8 turbo iterations with early stopping ON.

The FER performance plot 3700 is also shown having a CW2 3708 slightly under a Simp. CW2 3710 with 1 global iteration and 8 turbo iterations with early stopping ON. Finally, the FER performance plot 3700 is shown having a plot 3712 with 2 global iteration and 8 turbo iterations with early stopping ON.

Figure 38:
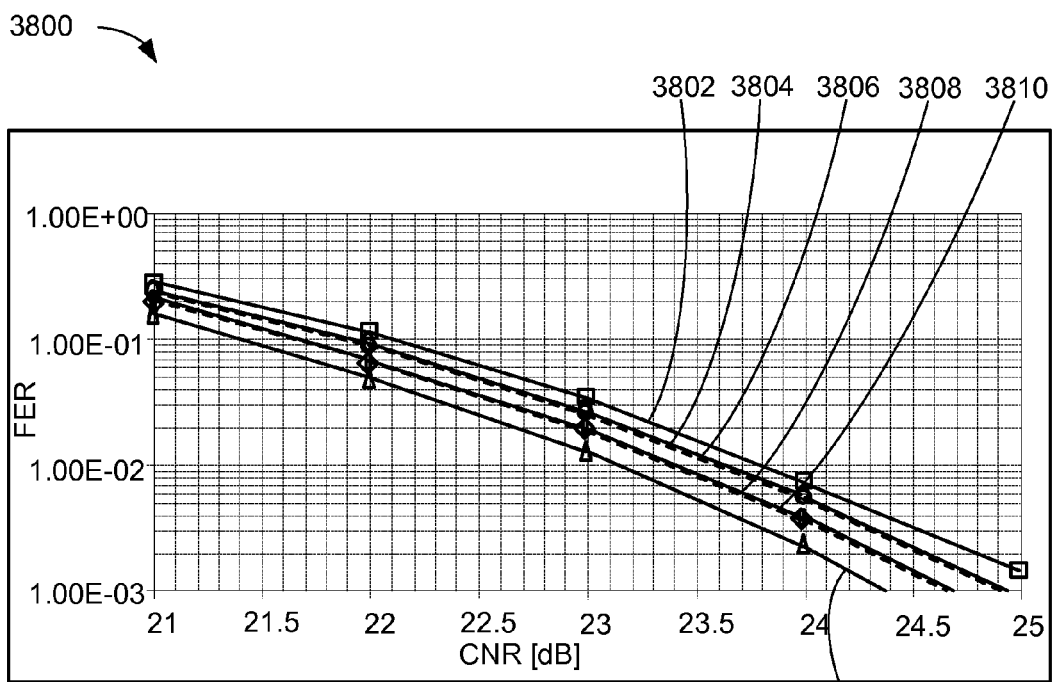
FIG. 38 is a FER performance plot for 64QAM constellation at high coding rate of the present invention.

Referring now to FIG. 38, therein is shown a FER performance plot 3800 for 64QAM constellation at high coding rate of an embodiment of the present invention. The FER performance plot 3800 can be the FER performance of the receiver block 104 for receiving the multiple transmissions 110 of FIG. 1. Simulation of the results of using this slicer using 2×2 open loop spatial multiplexing. No iterative detection and decoding is performed in the FER performance plot 3800, only the second code word can benefit from the a priori information after decoding the first code word.

The FER performance plot 3800 is shown having a ML 3802 with 1 global iteration and 8 turbo iterations with early stopping ON. The FER performance plot 3800 is also shown having a Better 3804 plot with 1 global iteration and 8 turbo iterations with early stopping ON, overlapping a Simp. 3806 iteration with 1 global iteration and 8 turbo iterations with early stopping ON.

The FER performance plot 3800 is also shown having a CW2 3808 overlapping a Simp. CW2 3810 with 1 global iteration and 8 turbo iterations with early stopping ON. Finally, the FER performance plot 3800 is shown having a plot 3812 with 2 global iteration and 8 turbo iterations with early stopping ON.

Figure 39:
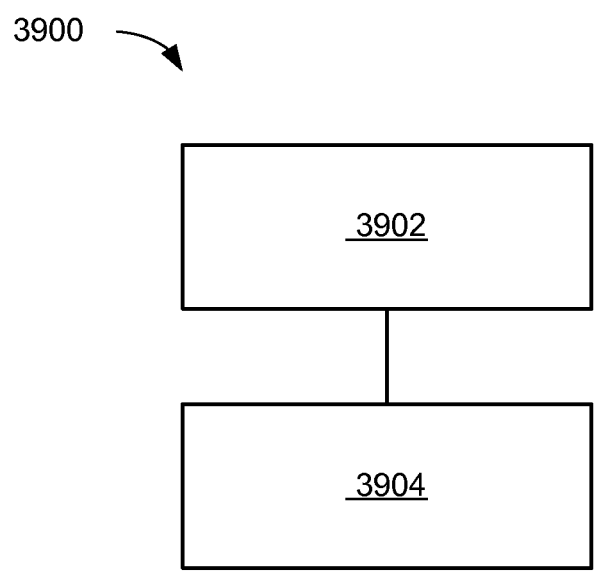
FIG. 39 is a flow chart of a method of operation of a communication system in a further embodiment of the present invention.

Referring now to FIG. 39, therein is shown a flow chart of a method 3900 of operation of a communication system in a further embodiment of the present invention. The method 3900 includes: utilizing an estimation module estimating a log-likelihood ratio for a transmission in a block 3902; and utilizing a slicing module, coupled to the estimation module, slicing a constellation by: reading the log-likelihood ratio from the estimation module, defining a threshold within the constellation, and adjusting the threshold based on the log-likelihood ratio for determining a symbol in a block 3904.

Thus, it has been discovered that the receiver system 201 of FIG. 2 and a priori shifted threshold 1104 of FIG. 11 of the present invention furnishes important and heretofore unknown and unavailable solutions, capabilities, and functional aspects for IDD receiver system configurations. The resulting processes and configurations are straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a communication system comprising:
   utilizing an estimation module estimating a log-likelihood ratio for a transmission; and
   utilizing a slicing module, coupled to the estimation module, slicing a constellation by:
      reading the log-likelihood ratio from the estimation module,
      defining a threshold within the constellation, and
      adjusting the threshold based on the log-likelihood ratio for determining a symbol.

2. The method as claimed in claim 1 wherein utilizing the slicing module includes slicing a first bit in a real dimension and a second bit in an imaginary dimension.

3. The method as claimed in claim 1 wherein utilizing the slicing module includes parallel slicing a first bit and a second bit from the constellation.

4. The method as claimed in claim 1 wherein:
   utilizing the slicing module includes slicing the transmission in a real dimension separately from an imaginary dimension; and
   examining only a pulse-amplitude modulation of the transmission.

5. The method as claimed in claim 1 wherein utilizing the slicing module includes slicing with the slicing module within a detector block.

6. A method of operation of a communication system comprising:
   utilizing an estimation module, having an a priori read block, and estimating a log-likelihood ratio for a transmission; and
   utilizing a slicing module, coupled to the a priori read block, slicing a Gray coded constellation by:
      reading the log-likelihood ratio from the estimation module,
      defining a threshold within the Gray coded constellation, and
      adjusting the threshold based on the log-likelihood ratio for determining a symbol by determining a bit in the dimension by magnitude only.

7. The method as claimed in claim 6 wherein utilizing the estimation module includes providing the estimation module having a conversion block cancelling interference and converting a transmission to an additive white Gaussian noise system by maximal ratio combining.

8. The method as claimed in claim 6 wherein utilizing the slicing module includes distinguishing between neighboring pulse-amplitude modulation signals with a single bit.

9. The method as claimed in claim 6 wherein utilizing the estimation module includes estimating the log-likelihood ratio based on information from two or more transmit antennae.

10. The method as claimed in claim 6 wherein utilizing the slicing module includes detecting the symbol with a hard detection.

11. A communication system comprising:
    an estimation module for estimating a log-likelihood ratio for bits of a transmission; and
    a slicing module, coupled to the estimation module, and the slicing module for slicing a constellation by reading the log-likelihood ratio from the estimation module, defining a threshold within the constellation, and adjusting the threshold based on the log-likelihood ratio for determining a symbol.

12. The system as claimed in claim 11 wherein the slicing module is for slicing a first bit in a real dimension and a second bit in an imaginary dimension.

13. The system as claimed in claim 11 wherein the slicing module slices, in parallel, a first bit and a second bit from the constellation.

14. The system as claimed in claim 11 wherein the slicing module slices the transmission in a real dimension separately from an imaginary dimension by examining only a pulse-amplitude modulation of the transmission.

15. The system as claimed in claim 11 wherein the slicing module slices within a detector block.

16. The system as claimed in claim 11 wherein the slicing module determines a bit in the dimension by magnitude only.

17. The system as claimed in claim 16 wherein the estimation module includes a conversion block cancelling interference and converting a transmission to an additive white Gaussian noise system by maximal ratio combining.

18. The system as claimed in claim 16 wherein the slicing module distinguishes between neighboring pulse-amplitude modulation signals with a single bit.

19. The system as claimed in claim 16 wherein the estimation module estimates the log-likelihood ratio based on information from two or more transmit antennae.

20. The system as claimed in claim 16 wherein the slicing module detects the symbol with a hard detection.

* * * * *